US011248360B2

(12) United States Patent
Nygren et al.

(10) Patent No.: US 11,248,360 B2
(45) Date of Patent: Feb. 15, 2022

(54) IMPLEMENT AND METHOD FOR CONTROLLING THE IMPLEMENT

(71) Applicant: ÅLÖ AB, Umeå (SE)

(72) Inventors: Tomas Nygren, Umeå (SE); Gustaf Lagunoff, Umeå (SE)

(73) Assignee: ÅLÖ AB, Umeå (SE)

( * ) Notice: Subject to any disclaimer, the term of this patent is extended or adjusted under 35 U.S.C. 154(b) by 293 days.

(21) Appl. No.: 16/379,595

(22) Filed: Apr. 9, 2019

(65) Prior Publication Data

US 2019/0234043 A1    Aug. 1, 2019

Related U.S. Application Data

(63) Continuation of application No. PCT/SE2017/050984, filed on Oct. 9, 2017.

(30) Foreign Application Priority Data

Oct. 10, 2016  (SE) .................... 1651330-1

(51) Int. Cl.
*E02F 3/43* (2006.01)
*F15B 21/08* (2006.01)
(Continued)

(52) U.S. Cl.
CPC ............ *E02F 3/431* (2013.01); *A01B 63/108* (2013.01); *E02F 3/283* (2013.01); *E02F 3/3604* (2013.01);
(Continued)

(58) Field of Classification Search
CPC ....... E02F 3/431; E02F 9/2004; E02F 9/2228; E02F 9/264; F15B 2211/63
See application file for complete search history.

(56) References Cited

U.S. PATENT DOCUMENTS

| 2,668,631 A | 2/1954 | Reese |
| 9,032,724 B2 * | 5/2015 | Pfaff ..................... E02F 9/2292 60/428 |

(Continued)

FOREIGN PATENT DOCUMENTS

| DE | 4235380 A1 | 12/1993 |
| EP | 0203662 A1 | 12/1986 |

(Continued)

OTHER PUBLICATIONS

International Search Report and Written Opinion for PCT/SE2017/050984, dated Mar. 7, 2018, 32 pages.

(Continued)

*Primary Examiner* — Abiy Teka
(74) *Attorney, Agent, or Firm* — Dinsmore & Shohl LLP

(57) ABSTRACT

The present disclosure relates to an implement connectable to a working vehicle. The implement includes an arm, a fastening arrangement arranged at a first part of the arm, and an attaching arrangement connected to a second part of the arm. The fastening arrangement is connectable to the working vehicle. The attaching arrangement is attachable to a working tool. The implement further includes a first hydraulic circuit configured to carry hydraulic fluid to at least one first hydraulic function and a local control element. The implement further includes a digital interface to the working vehicle. The local control element is arranged to receive an operator control signal via said digital interface for operator control of the at least one first hydraulic function.

26 Claims, 7 Drawing Sheets

(51) Int. Cl.
*A01B 63/108* (2006.01)
*E02F 9/26* (2006.01)
*E02F 3/627* (2006.01)
*E02F 3/36* (2006.01)
*E02F 3/28* (2006.01)
*E02F 3/42* (2006.01)
*E02F 9/20* (2006.01)
*E02F 9/22* (2006.01)
*F15B 11/16* (2006.01)
*A01B 63/10* (2006.01)

(52) U.S. Cl.
CPC .......... *E02F 3/3654* (2013.01); *E02F 3/3695* (2013.01); *E02F 3/422* (2013.01); *E02F 3/627* (2013.01); *E02F 9/2004* (2013.01); *E02F 9/2228* (2013.01); *E02F 9/264* (2013.01); *E02F 9/265* (2013.01); *F15B 11/16* (2013.01); *F15B 21/08* (2013.01); *A01B 63/10* (2013.01); *F15B 2211/427* (2013.01); *F15B 2211/6336* (2013.01); *F15B 2211/6346* (2013.01); *F15B 2211/6654* (2013.01); *F15B 2211/71* (2013.01)

(56) References Cited

U.S. PATENT DOCUMENTS

| | | |
|---|---|---|
| 2003/0233773 A1 | 12/2003 | Mieger et al. |
| 2004/0024510 A1 | 2/2004 | Finley et al. |
| 2005/0210713 A1 | 9/2005 | Mennen et al. |
| 2006/0047393 A1 | 3/2006 | Casey et al. |
| 2006/0212203 A1* | 9/2006 | Furuno ................. E02F 9/2292 701/50 |
| 2007/0130935 A1 | 6/2007 | Stephenson et al. |
| 2007/0240413 A1 | 10/2007 | Mauch et al. |
| 2009/0216412 A1* | 8/2009 | Mindeman ........... G05B 19/106 701/50 |
| 2014/0277962 A1 | 9/2014 | Lougheed |
| 2014/0294622 A1 | 10/2014 | Fedde |

FOREIGN PATENT DOCUMENTS

| | | |
|---|---|---|
| EP | 0247335 A2 | 12/1987 |
| EP | 2644780 A2 | 10/2013 |
| WO | 0171198 A2 | 9/2001 |
| WO | 2009025772 A1 | 2/2009 |
| WO | 2013020856 A2 | 2/2013 |

OTHER PUBLICATIONS

Swedish Search Report for Patent Application No. 1651330-1, dated Jun. 2, 2017, 3 pages.

* cited by examiner

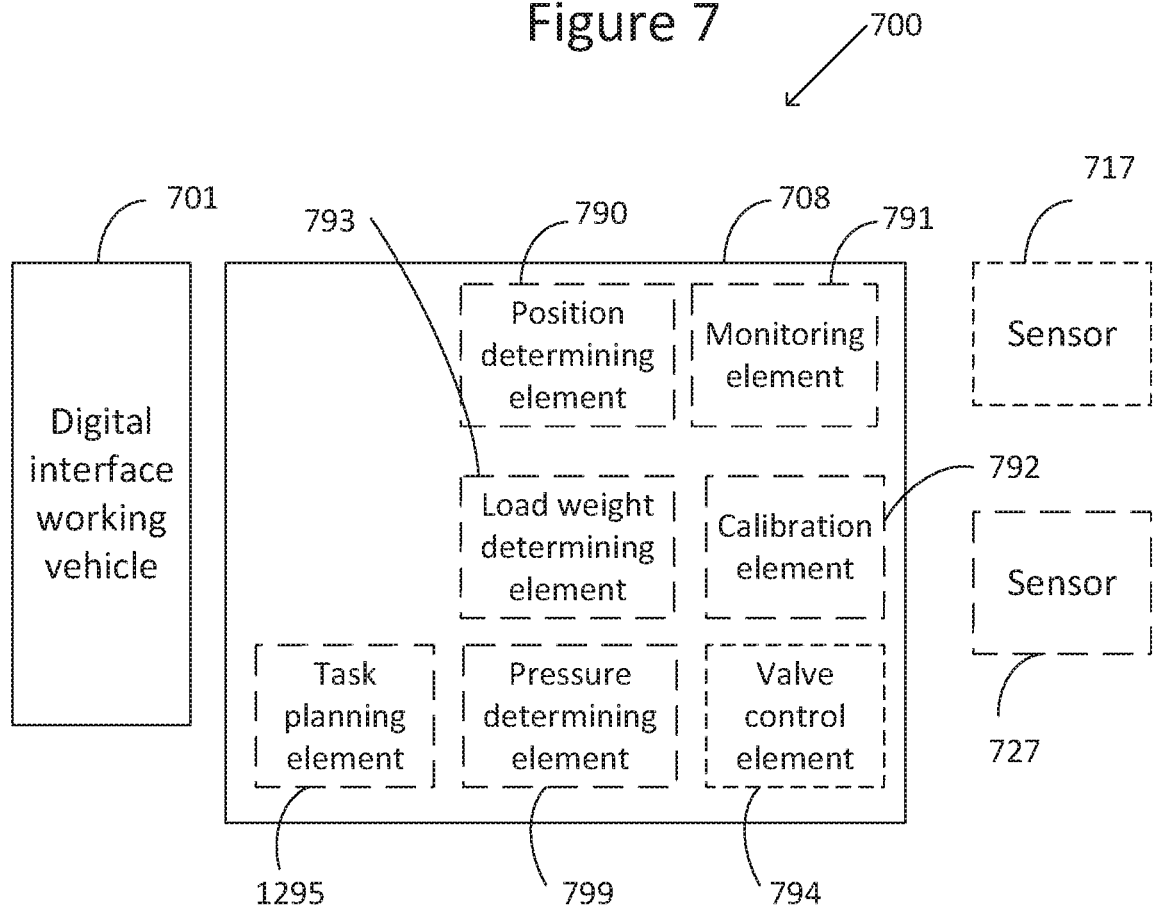
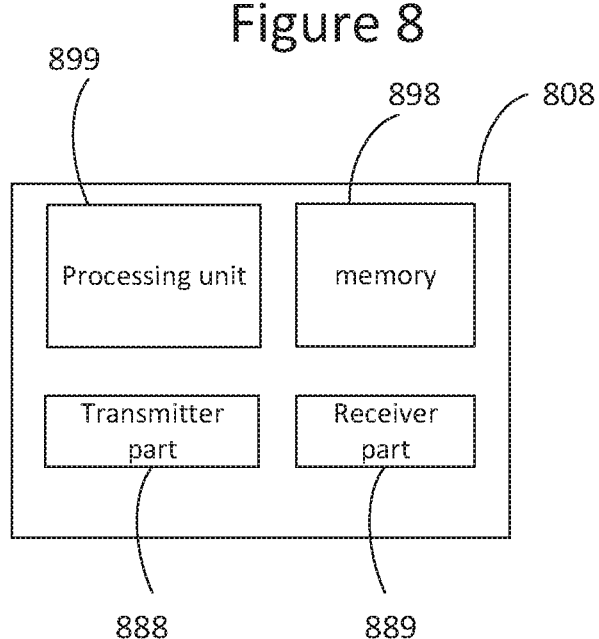
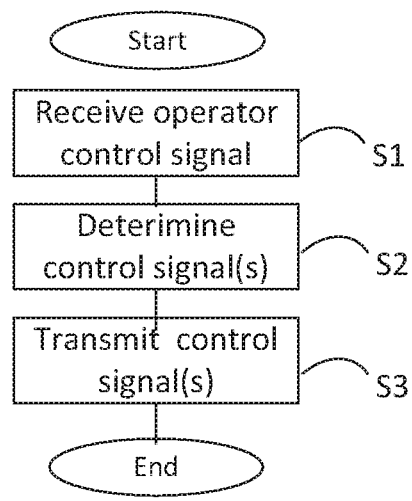

IMPLEMENT AND METHOD FOR CONTROLLING THE IMPLEMENT

RELATE APPLICATIONS

The present application is a continuation of PCT Application No. PCT/SE2017/050984 filed Oct. 9, 2017, which claims priority to Swedish Application No. SE 1651330-1, filed Oct. 10, 2016, all of which are hereby incorporated in their entirety by reference as set forth herein.

TECHNICAL FIELD

The present disclosure relates to an implement connectable to a working vehicle, wherein said implement comprises an arm, a fastening arrangement arranged at a first part of the arm, said fastening arrangement being connectable to the working vehicle; an attaching arrangement connected to a second part of the arm, said attaching arrangement being attachable to a working tool; and a first hydraulic circuit configured to carry hydraulic fluid to at least one first hydraulic function.

The present disclosure further comprises a working vehicle arrangement comprising a working vehicle comprising a fastening arrangement connectable to the implement; and said implement.

The present disclosure further relates to a method for control of at least one vehicle control valve based on operator control signals.

TECHNICAL BACKGROUND

Agricultural vehicles, such as tractors may be provided with a front loader. Operation of this front loader is controlled from the cabin of the tractor. For example an operator at the cabin of the tractor controls lifting and lowering of the loader and movement of a working tool attached to the loader. The lifting and lowering of the loader may be performed by means of a first hydraulic circuit and movement of the attachment is characteristically performed by means of a hydraulic circuit controlled from the tractor.

WO 2013/020856 discloses an implement for attachment to a vehicle, wherein a first hydraulic circuit for controlling at the front loader is connectable to a control valve at the tractor. The control valve, and switch means, is controlled by a tractor control unit in the tractor to regulate fluid flow through the first hydraulic circuit.

There are also known in the art work vehicles having multiple control units.

US 20090216412 relates to a power machine provided with an implement. The power machine has a controlling unit 124 and the implement has a second control unit 128. The power machine or attachment can be selectably controlled by means of a joystick, where the power machine can be controlled via the controlling unit 124 of the power machine or the second control unit 128 of the implement. The second control unit 128 is arranged to communicate with the power machine by means of a CAN controller at the power machine.

SUMMARY

One object of the present disclosure is to obtain an improved implement connectable to a working vehicle.

This has in different embodiments been achieved by means of an implement connectable to a working vehicle. The implement comprises an arm, a fastening arrangement arranged at a first part of the arm, said fastening arrangement being connectable to the working vehicle; an attaching arrangement connected to a second part of the arm, said attaching arrangement being attachable to a working tool; a first hydraulic circuit configured to carry hydraulic fluid to at least one first hydraulic function; and a local control element. The implement comprises further a digital interface to the working vehicle. The local control element is arranged to receive an operator control signal via said digital interface for operator control of the at least one first function. The local control element is arranged to determine a valve control signal adapted to control at least one control valve for controlling the first hydraulic circuit based on said operator control signal, and to transmit said valve control signal to the digital interface for transmission to the at least one control valve.

Both communication of data to the implement and communication of data to the at least one control valve are performed digitally via the digital interface. This provides for a robust solution where no analogue signals have to be communicated to and from the local control element arranged at the implement.

Further, the intelligence is related to the implement. The control element of the implement performs control; it is no just a gatherer of data. In fact, no intelligence for controlling the implement is required at the working vehicle. This simplifies the control system of the working vehicle. The working vehicle can be manufactured at lower cost. In fact, as the intelligence for control of the implement is arranged at the implement, the implement hardware and software forms an independent module which can be equipped to the working vehicle when it is desired to have an implement attached to the working vehicle. A working vehicle without an implement does not need to be prepared with components for use when an implement it attached.

The implement can be used at any working vehicle. As is clear from the above, small or substantially no preparations are required at the working vehicle for installing the implement.

Further, as is apparent from above, it is the implement which decides, by means of its local control element, about the operation of the implement and thus, determines the valve control signal adapted to control the control valve. Thus, it is the implement which decides and requests which hydraulic pressure the implement needs. The implement has the ability to know its characteristics, parameters and settings. The work vehicle to which the implement is attached does not know that, at least not without providing a separate logistic solution for obtaining this information. In fact, the work vehicle has often no way of knowing which implement is attached, and the work vehicle does certainly not know the characteristics, parameters and settings of the implement presently attached. Accordingly, the work vehicle is not capable of forming a valve control signal where implement characteristics, parameters or settings have been taken into account. For example, the implement may store information related to its set-up, such as which types of sensors are attached and their characteristics. The implement may instead or in addition thereto store information related to ranges between which the implement and/or any tool attached thereto is allowed to move. Accordingly, the work vehicle does not need to access any information related to the implement. Further, the work vehicle does not need to have any software related to the operation of the implement. The work vehicle may need to have a minimum amount of software for the interface to the implement, but that is all.

The valve control signal for the control of the at least one control valve may be an analogue or digital signal. The valve control signal is characteristically a low voltage signal. The low voltage signal may be in the range of 0 to 5 V. The low voltage signal may be a variable amplitude, frequency or pulse width modulated signal.

In different embodiments the first hydraulic circuit is configured to carry hydraulic fluid from a first hydraulic connection connectable to the working vehicle to the at least one first hydraulic function. The control valve may then be arranged at the working vehicle.

Accordingly, as the local control element can be used for control of hydraulics at the working vehicle for control of the implement, the working vehicle does not need to comprise components secured for control of the implement. All such components are present within the implement. Thus, the working vehicle can be produced at a lower cost.

In different embodiments the at least one control valve is a control valve dedicated for control of hydraulic functions of the implement and/or tool(s) attached thereto.

As is clear from the above, the working vehicle can then be clean from any devices for control of the implement, when the working vehicle is not provided with an implement. When an implement is to be attached to the working vehicle and using dedicated control valves, the dedicated control valves are connected to the pump and reserve of the working vehicle and the implement is mounted to the working vehicle. The control valves for control of the first hydraulic function can then be adapted for control of the implement functions. No adaptations to other possible consumers of hydraulics (having other requirements) are necessary. Further, the function of the local control element for control of the at least one control valve may be adapted to the implement on which it is mounted. Further, the function of the local control element for control of the at least one control valves may also be adapted to the characteristics of the control valve(s) it is adapted to control.

In different embodiments the at least one control valve is a vehicle control valve adapted for the control of substantially all of the hydraulic functions of the working vehicle to which the vehicle control valve is mounted. Instead or in addition thereto, the operator interface obtaining operator signals to the local control element may be a general purpose operator interface adapted for user control of other functions than the at least one first hydraulic function.

In accordance with these embodiments, when the implement is installed at a working vehicle where pre-installed or general purpose vehicle control valves and/or pre-installed or general purpose vehicle interface(s) are to be used, a gateway is provided. The gateway may be arranged to direct signals from the operator interface intended for the local control element to said local control element via the digital interface. The gateway may instead or in addition thereto be arranged to direct valve control signals received directly from the local control element or via the digital interface to the control valve. Further, the data handled by the local control element, such as operator control data and determined control data for the working vehicle control valves can be stored at the local control element. Program code for executing the different tasks of the local control element may also be stored at the implement. Further, the local control element can store data related to characteristics of the implement to which it is mounted. The local control element can also be arranged to store information related to different working tools which can be mounted to the implement. The local control element comprises one or a plurality of memories for storing at least some of the data above.

Accordingly, all data related to operation of the implement can be obtained, processed and stored at the implement. Further, characteristics of the implement can be stored at the implement for example for use in the processing. Thus, as all data related to the implement can be stored at the implement, it follows that if an implement is moved for example from one working vehicle to another working vehicle, all data associated therewith follows the implement. This enables accurate monitoring and/or control of the operation of the implement.

The control valve may be a proportional bi-directional control valve.

The local control element is in different embodiments arranged to obtain an additional valve control signal adapted to control at least one additional control valve at the implement based on said operator control signal, and to feed said additional valve control signal to said at least one additional control valve. The operator control signal may then comprise a selector signal. The at least one additional control valve may comprise a switch valve. The switch valve is then arranged to switch between opening/closing based on the selector signal. The at least one additional control valve may comprise a selector valve. The selector valve is then arranged to select a hydraulic circuit based on the selector signal.

Accordingly, signals for control of the additional control valve(s) are determined by the local control element and fed to the additional control valve(s) at the implement. The signals for control of the additional control valve(s) do not need to be fed to the working vehicle at all.

Further, the local control element may be supplied with a power supply such as by means of a 12V or 24V battery. The signals provided from the local control element to the additional control valve(s) may then have enough power to be able to drive the additional control valve(s). No individual power signal from the working vehicle is required for each additional control valve.

In different embodiments, the at least one first hydraulic function comprises a function for movement of the working tool in relation to the implement.

In different embodiments, the at least one first hydraulic function comprises a hydraulic working tool lock mounted in parallel with the function for movement of the working tool.

In different embodiments, the implement comprises a first hydraulic cylinder arrangement connected to the first hydraulic connection for control of the at least one first hydraulic function.

In different embodiments, the implement comprises at least one first sensor arranged to obtain sensor signals at least related to the at least one first function. The local control element is then arranged to receive the obtained sensor signals and to determine the valve control signal adapted to control at least the at least one vehicle control valve based on the obtained sensor signals.

The at least one first sensor can be digitally or analogously connected to the local control element. Irrespectively, no wiring to the working vehicle for transfer of sensor signals is needed. The sensors and communication path for the sensor signals to the local control element can therefore be entirely formed at the implement. Alternatively, the at least one first sensor may comprise a sensor arranged at the working tool and digitally or analogously connected to the local control element.

Sensor data obtained from the at least one sensor and possible control data from the operator input element can be stored at the local control element. Further, processed information related to the obtained sensor data may also be stored at the local control element.

As was also discussed above, all data related to operation of the implement can be obtained, processed and stored at the implement. Further, characteristics of the implement can be stored at the implement for example for use in the processing. Thus, as all data related to the implement can be stored at the implement. This has the consequence that if an implement is moved for example from one working vehicle to another working vehicle, all data associated therewith follows the implement. This enables accurate monitoring of the operation of the implement. Operational data, comprising for example state parameter(s), is obtained by and related to the implement. Switching the implement between working vehicles can be made without disturbing monitoring. Monitoring can be made when the implement is attached to any working vehicle.

In different embodiments, the at least one first sensor comprises a sensor arranged to obtain signals relating to the rotational position of the working tool in relation to the implement. The at least one first sensor may be arranged to sense a pivotal position of the working tool in relation to the implement. The at least one first sensor may comprise a radial Hall sensor.

In different embodiments, the implement further comprises a second hydraulic circuit configured to carry hydraulic fluid to at least one second hydraulic function. The operator control signal received via said digital interface is arranged for operator control also of the second function.

The second hydraulic circuit may be configured to carry hydraulic fluid from a second hydraulic connection connectable to the working vehicle to the at least one second hydraulic function.

In different embodiments, the second hydraulic function comprises a function for lifting/lowering of the implement in relation to the working vehicle.

In different embodiments, a second hydraulic cylinder arrangement is arranged to control of the at least one second hydraulic function.

In different embodiments, the implement comprises at least one second sensor arranged to obtain sensor signals also related to the second hydraulic function. The local control element is then arranged to receive the obtained sensor signals and to determine the valve control signal adapted to control at least the at least one control valve based on the obtained sensor signals.

The at least one second sensor can be digitally or analogously connected to the local control element. Irrespectively, no wiring to the working vehicle for transfer of sensor signals is needed. The sensors and communication path for the sensor signals to the local control element can therefore be entirely formed at the implement. Alternatively, the at least one second sensor may comprise a sensor arranged at the working tool, wherein said sensor is digitally or analogously connected to the local control element.

In different embodiments, the at least one second sensor comprises a sensor arranged to obtain signals relating to the rotational position of the implement in relation to the working vehicle. The at least one second sensor may be arranged to sense a pivotal position of the implement in relation to the working vehicle. The at least one second sensor may comprise a radial Hall sensor.

In different embodiments, the at least one first and/or second sensor comprises at least one pressure sensor arranged to obtain a signal related to a hydraulic pressure.

In different embodiments, the at least one a pressure sensor may be arranged to obtain a signal related to at least one pressure related to the at least one first and/or second cylinder arrangement. The local control element may then be arranged to determine a load weight based on a relation between the load weight and the hydraulic pressure.

The at least one pressure sensor can be digitally or analogously connected to the local control element. Irrespectively, no wiring to the working vehicle for transfer of sensor signals is needed. The sensors and communication path for the sensor signals to the local control element can therefore be entirely formed at the implement. Alternatively, the at least one pressure sensor may comprise a sensor arranged at the working tool, wherein said sensor is digitally or analogously connected to the local control element.

In different embodiments, the digital interface comprises a contactless probe for connection to a digital data bus of the working vehicle. The contactless probe is arranged to monitor the traffic on the digital data bus and to recover signals or messages having predetermined characteristics.

The contactless probe may be arranged to recover signals or messages comprising the operator control signal.

The contactless probe may be arranged to recover also other types of messages or signals useful for the local control element. For example, the contactless probe may be arranged to recover signals related to status of hitch to make sure that implement is not active while operating front or rear hitch and/or status of seat switch for safety purposes, i.e. to make sure that the operator is seated while operating the implement and/or information on time to next working vehicle service to suggest implement service actions and/or information of ground speed or velocity for example for safety functions at high speed and/or information related to engine speed.

The contactless probe is arranged to transmit the recovered messages or signals to the local control element.

In accordance with the above, the contactless probe can recover signals or messages from vehicle control bus(ses) without risking damaging the communication over said vehicle control bus(ses). In fact, no manipulation with any working vehicle hardware and/or software is necessary.

The digital interface may be arranged to transfer the valve control signals by way of a digital channel such as a digital data bus (e.g. CAN) to the working vehicle.

The digital interface to the working vehicle may be arranged to transfer the valve control signals wirelessly to the working vehicle.

In different embodiments, the implement further comprises a digital working tool interface for communication with at least one working tool sensor and/or a local working tool control element at the working tool, wherein the digital working tool interface is connected to the local control element.

The digital working tool interface may be arranged to communicate wirelessly with the at least one working tool sensor and/or a local working tool control element at the working tool.

The digital working tool interface may be arranged to communicate with the at least one working tool sensor and/or a local working tool control element by way of a digital channel such as a CAN bus.

Different embodiments of the present disclosure relates to a working vehicle arrangement. The working vehicle arrangement comprises a working vehicle comprising a fastening arrangement connectable to an implement; and the implement according to the above. The fastening arrangement of the implement is arranged to fasten to the fastening arrangement of the working vehicle.

In different embodiments, the implement is detachably fastened to the working vehicle.

In different embodiments, the implement is detachably fastened to the working vehicle such that the implement is rotatable in relation to the working vehicle in at least one direction.

In different embodiments, the working vehicle comprises at least one control valve arranged to be at least partly controlled by the valve control signal.

The at least one vehicle control valve can be a general purpose control valve adapted to support also other hydraulic functions of the working vehicle. Then, one or more additional hydraulic consumers can be connected to a hydraulic circuit fed with the hydraulic fluid by means of said general purpose vehicle control valves.

Alternatively the vehicle control valves are control valves dedicated for control of hydraulic functions of the implement or working tool(s) attached thereto. Then, the working vehicle can be clean from devices for control of implement, when the working vehicle is not provided with an implement. When an implement is to be attached to the working vehicle, the dedicated control valves are mounted to the pump and reserve of the working vehicle and the implement is mounted to the working vehicle. The vehicle control valves for control of the implement can in accordance with these embodiments be adapted for control of the implement functions. No adaptations to other possible hydraulic consumers (having other requirements) are necessary. Further, the function of the vehicle control element for control of the vehicle control valves is adapted to the implement on which it is mounted. Further, the function of the vehicle control element for control of the vehicle control valves may also be adapted to the characteristics of the vehicle control valve(s) it is adapted to control.

In different embodiments, the working vehicle comprises a digital channel for transmission of the valve control signals from the digital interface to the at least one control valve. The digital channel may be a wireless channel. The digital channel may be a wired digital channel.

The working vehicle comprises in accordance with different embodiments further an operator interface for operator control of the at least one first hydraulic function and possibly said second hydraulic function. The operator interface is arranged to communicate with the digital interface. The operator interface may comprise an operator input element such as a joystick. The operator interface may comprise a display arranged to display information related the at least one hydraulic function. The display may be a display with input means such as a touch screen display, a display with a keyboard and/or a mobile device with display such as a PDA.

In different embodiments, the working vehicle further comprises a vehicle control element for control of vehicle functions.

In different embodiments the vehicle control element comprises a gateway arranged to direct signals from the operator interface intended for the local control element to said local control element via the digital interface and/or to direct valve control signals received directly from the local control element or via the digital interface to the control valve.

Accordingly, the gateway can be arranged to direct operator control signals intended for the local control element to the local control element. The gateway can further be arranged to direct also other types of signals to the local control element useful for control of the control valves. For example, information related to the speed or velocity of the working vehicle and/or engine speed or velocity and/or service messages related to that it is time for service of the working vehicle.

The gateway can, as stated above be arranged to direct valve control signals intended for the control valve(s) to said control valve(s). Further the gateway can direct other requests from the local control element to the working vehicle. For example, the local control element may request a certain speed/velocity of the working vehicle and/or engine speed/velocity. The gateway can then be arranged to direct this request for example to the operator interface of the working vehicle.

Different embodiments of the present disclosure comprise further a method for controlling at least one control valve based on operator control signals. The method is performed at an implement connectable to a working vehicle. The implement comprises a fastening arrangement arranged at a first part of the implement and an attaching arrangement connected to the second part of the implement, wherein said attaching arrangement is attachable to a working tool. The implement comprises further a first hydraulic circuit configured to carry hydraulic fluid to at least one first hydraulic function; a digital interface to the working vehicle and an local control element connected to said digital interface. The method comprises the steps of receiving via said interface an operator control signal for operator control of the at least one first function, determining by means of the local control element a valve control signal adapted to control at least one control valve based on said operator control signal, and transmitting said valve control signal to the digital interface for transmission to at least one control valve.

Different embodiments of the present disclosure further relates to software for control of at least one vehicle control valve based on operator control signals, said software being adapted to perform the method as disclosed above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 7 is a block scheme schematically illustrating an example of an implement system.

FIG. 8 is a block scheme schematically illustrating an example of a local control element.

FIG. 9 is a flow chart illustrating an example of a method for control of at least one vehicle control valve based on operator control signals.

DETAILED DESCRIPTION OF EMBODIMENTS

Figure 1:
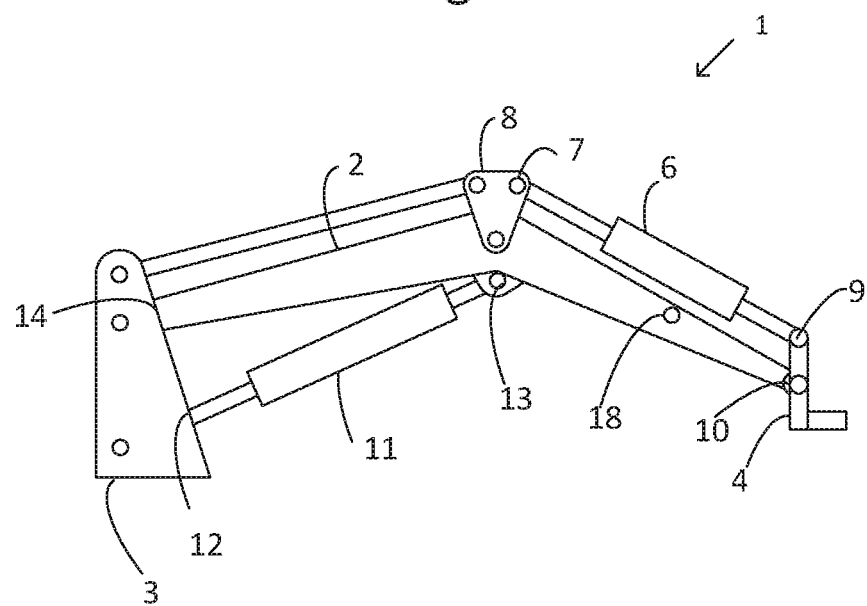
FIG. 1 illustrates an example of an implement attachable to a working vehicle.

Aspects of the present disclosure will be described more fully hereinafter with reference to the accompanying drawings. The apparatuses and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In FIG. 1 an implement 1 connectable to a working vehicle is illustrated. The implement, or loader, forms an elongated working tool carrier. The implement may be a front loader.

In the illustrated example, the implement comprises an arm 2. A fastening arrangement 3 is arranged at a first part of the arm. The fastening arrangement is connectable to the working vehicle. The fastening arrangement is in one example attached in relation to the arm 2 such that the arm can be moved in relation to the working vehicle. The arm can be made to make a pivoting movement in relation to the working vehicle around a pivot axis of the fastening arrangement.

The implement further comprises an attaching arrangement 4 connected to a second part of the arm 2. The attaching arrangement 4 is attachable to a working tool. The attaching arrangement 4 is in one example attached in relation to the arm 2 such that the attachment arrangement possibly with the working tool can be moved in relation to the arm 2. For example, the attaching arrangement 4 may be pivotally arranged in relation to the arm. Thereby the attaching arrangement 4 can be made to make a tilting movement in relation to the arm.

In the illustrated example, the arm 2 is an elongated arm. The arm is in the illustrated example rigid. The arm is on one example straight. The arm has in one example an elbow. The arm may comprise a plurality of elongated supporting arms connected to each other by transverse supports.

In the illustrated example, the implement comprises a first hydraulic cylinder arrangement 6. The first hydraulic cylinder arrangement 6 is when actuated arranged to cause the implement to carry out at least one first function. In the example, the at least one first function comprises a control of the attachment arrangement, and consequently a working tool attached thereto, in relation to the arm 2. Thus, movement of the attaching arrangement, and the working tool, when attached, can be controlled by the first hydraulic cylinder arrangement 6. The attachment arrangement 4 and the working tool 5 can be controlled to perform a tilting movement. In the illustrated example, the first hydraulic cylinder arrangement 6 is at its first end 7 attached to the arm. The first hydraulic cylinder arrangement 6 is for example mounted to the arm 2 at the middle of the arm. The first hydraulic cylinder arrangement 6 is in the illustrated example at its first end 7 mounted at an elbow of the arm. In the illustrated example, the first hydraulic cylinder arrangement 6 is at its first end 7 mounted to a support 8 mounted at the arm. In one example, the first cylinder arrangement 6 comprises a pair of first hydraulic cylinders. In one example the first cylinder arrangement comprises one first hydraulic cylinder. When the arm comprises a plurality of elongated supporting arms connected to each other by transverse supports, one or a plurality of first cylinders can be mounted to each of the supporting arms.

Further, in the illustrated example, the first hydraulic cylinder arrangement 6 is at its second end 9 attached to the attaching arrangement 4 for attachment to the working tool. In one example, the first hydraulic cylinder arrangement 6 extends in parallel with the arm 2. Thus there is a radial distance between a point of (pivoting) attachment 10 of the attachment arrangement to the arm 2 and the point of attachment 9 of the first hydraulic cylinder arrangement 6 to the attachment arrangement 4. Thereby the attachment arrangement 4, and working tool when attached, performs a pivoting movement in relation to the arm 2 as the piston(s) of the hydraulic cylinder arrangement 6 is extracted/retracted. In one example, the point of attachment of the second end 9 of the first hydraulic cylinder arrangement is straight above the point of attachment 10 of the attachment arrangement 4 at the arm 2. In one example, the attachment is such that the attachment arrangement 4 can perform a rotating movement in relation to the arm 2.

In the illustrated example, the implement 1 comprises further a second hydraulic cylinder arrangement 11. The second hydraulic cylinder arrangement 11 is when actuated arranged to cause the implement 1 to carry out a second function. In the illustrated example, the at least one second function comprises movement of the arm 2 in relation to the working vehicle, when the implement 1 is attached to the working vehicle. The arm 2 may be moved in a generally vertical direction in relation to the working vehicle. Movement of the arm 2 can be controlled by said second hydraulic cylinder arrangement 11. The arm 2 can be controlled to perform a pivoting movement. In the illustrated example, the second hydraulic cylinder arrangement 11 is at its first end 12 attached to the fastening arrangement 3. Further, in the illustrated example, the second hydraulic cylinder arrangement 11 is at its second end 13 attached to the arm 2. The first end 12 is attached to the fastening arrangement 3 at a radial distance from an attachment point 14 of the arm. Thereby, the arm 2 of the implement is caused to perform a movement upon action/retraction of the piston(s) in the second hydraulic cylinder arrangement 11. In one example, the first end 12 is attached to the fastening arrangement 3 vertically in relation to the attachment 14 of the arm to the fastening arrangement 3. In accordance with this example, the arm 2 of the implement 1 is caused to perform a lifting/lowering movement upon extraction/retraction of the piston(s) of the second hydraulic cylinder arrangement 11. In one example, the second cylinder arrangement 11 comprises a pair of second hydraulic cylinders. In one example the second cylinder arrangement comprises one second hydraulic cylinder. When the arm comprises a plurality of elongated supporting arms connected to each other by transverse supports, one or a plurality of second cylinders can be mounted to each of the supporting arms.

The first and/or second hydraulic cylinder arrangements 6, 11 are connected to a respective hydraulic circuit on the working vehicle, when the implement is attached to the working vehicle. The respective hydraulic circuit carries fluid to the corresponding at least one cylinder based on control from a hydraulic control valve at the working vehicle.

Different working tools can be attached to the attachment arrangement 4 of the implement, such as a bucket, a bale handler etc.

An example of a working tool attachable to the implement is a standard bucket for transporting bulk material. The first cylinder arrangement 6 may be arranged to pivot the bucket. The second hydraulic cylinder arrangement 11 may be arranged to raise and lower the arm and consequently the bucket attached thereto.

Further, the implement comprises a local control element 18. The local control element is in the illustrated mounted at the arm 2. However, it can be mounted anywhere at the implement 1.

Figure 2:
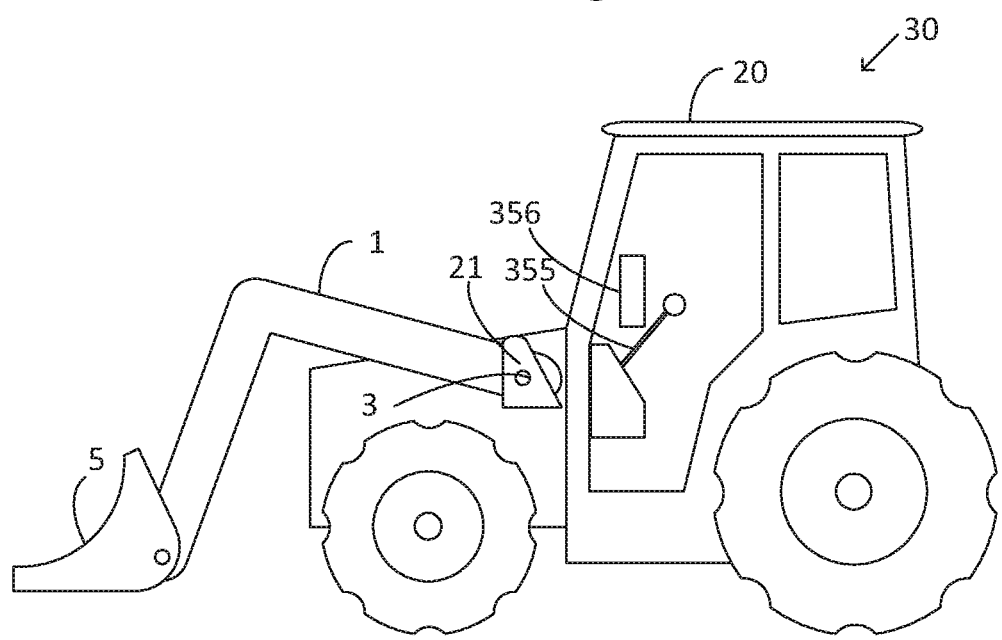
FIG. 2 illustrates an example of a working vehicle arrangement comprising a working vehicle and an implement attached thereto.

In FIG. 2, a working vehicle arrangement 30 is illustrated. The working vehicle arrangement 30 comprises a working vehicle 20 comprising a fastening arrangement 21 connectable to an implement 1, and said implement 1. The implement has a cooperating fastening arrangement 3 which fastens to the fastening arrangement 21 of the working vehicle. The implement 1 may be detachably fastened to the working vehicle. The implement may be fastened to the working vehicle such that the implement is rotatable around its points(s) of attachment in relation to the working vehicle in at least one direction.

The implement 1 may have the features as discussed in relation to FIG. 1. The working vehicle 20 is arranged to support hydraulics to the function of the implement when said implement is connected to the working vehicle and the hydraulic system is pressurized.

The working vehicle comprises an operator interface by means of which an operator controls at least one first hydraulic function of the implement. The operator control signals from the operator interface are received at the implement by means of a digital interface. The implement has a local control element in communication with the digital interface. The local control element is arranged to receive the operator control signals and based thereon form a valve control signal.

The working vehicle arrangement comprises at least one control valve for control of the at least one function of the implement. The control valve is at least partly controlled by the valve control signal. The control valve is arranged to control a hydraulic fluid to the at least one function of the implement.

The control valve may be a proportional bi-directional control valve.

The operator interface comprises in the illustrated example an operator input element 355 such as a joystick. The joystick may be provided with buttons and/or a scroll wheel, etc.

The operator interface comprises further in the illustrated example a display 356. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant).

The working vehicle can be any type of working vehicle such an agricultural working vehicle such as a tractor.

In the illustrated example the working vehicle is a tractor. In the illustrated example the implement is a front loader.

Figure 3:
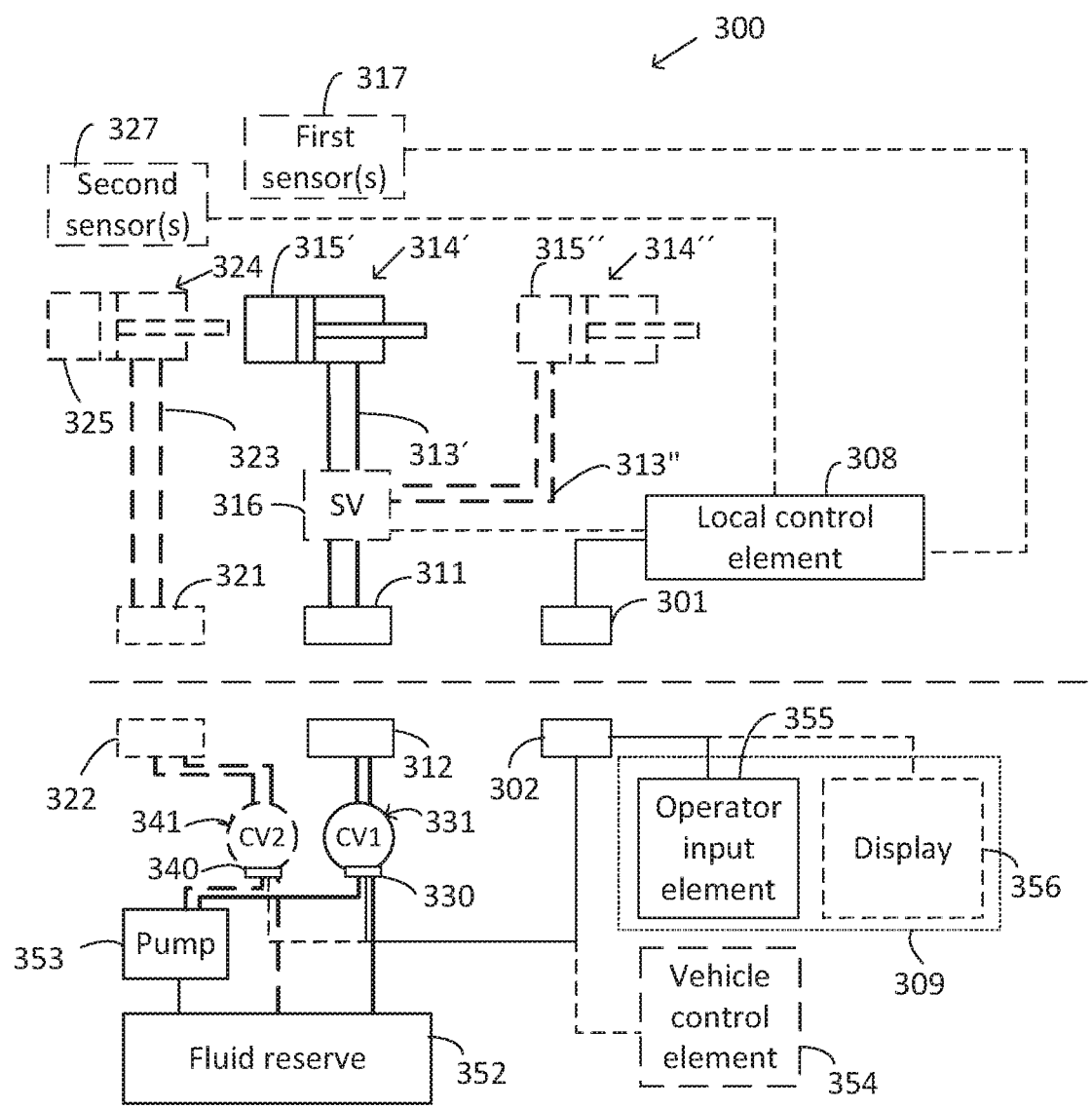
FIG. 3 illustrates a first hydraulic/electric circuit diagram for controlling an implement according to a first example.

In FIG. 3, a hydraulic and electric circuit diagram 300 for controlling an implement of a working vehicle is illustrated. The hydraulic and electric circuit diagram 300 is arranged for controlling at least one control valve based on operator control signals. The diagram comprises parts located on the working vehicle and parts located on the implement. A dashed line horizontally dividing the Figure in two parts shows an example of which parts can be located on the working vehicle and which parts can be located on the implement.

In the illustrated example, the implement part comprises a first hydraulic connection 311 connectable to the working vehicle. The first implement hydraulic connection 311 is connectable to the working vehicle by means of a corresponding first vehicle hydraulic connection 312. First hydraulic circuits 313', 313" are when the first implement hydraulic connection 311 is connected to the corresponding first vehicle hydraulic connection 312 configured to carry hydraulic fluid via said first hydraulic connections 311, 312 to at least one first hydraulic function 314', 314". In the illustrated example the at least one first function 314', 314" is carried out by means of actuation of a first hydraulic cylinder arrangement 315', 315". In FIG. 1, examples are given related to the mounting of the first cylinder arrangement at the implement. When there is more than one first function, a common first hydraulic cylinder is in one example adapted to carry out the first functions (not illustrated). Alternatively, as is illustrated in FIG. 3, different cylinders 315', 315" are used for carrying out the different first hydraulic functions 314', 314". Thus, the respective cylinder of the first hydraulic cylinder arrangement 315', 315" is connected to the first implement hydraulic connection 311 for controlled supply of pressurized fluid to the associated first hydraulic function for control of the first hydraulic function.

The at least one first hydraulic function 314', 314 may comprise a function 314' for movement of the working tool in relation to the implement. The at least one first hydraulic function may further comprise a further function 314" such as a hydraulic working tool lock mounted in parallel with the function for movement of the working tool.

In the illustrated example, the first hydraulic circuit 313' is connectable to at least one further first hydraulic circuit 313" by means of switch means 316. The switch means comprises in one example a switch valve and/or selector valve.

The implement part may also comprise a second hydraulic connection 321 connectable to the working vehicle. The second implement hydraulic connection 321 is connectable to the working vehicle by means of a corresponding second vehicle hydraulic connection 322. A second hydraulic circuit 323 is when the second implement hydraulic connection 321 is connected to the corresponding second vehicle hydraulic connection 322 configured to carry hydraulic fluid via said first hydraulic connections 321, 322 to at least one second hydraulic function 324. In the illustrated example the at least one second function 324 is carried out by means of actuation of a second hydraulic cylinder arrangement 325. In FIG. 1, examples are given related to the mounting of the second cylinder arrangement 325. When there are more than one second function, a common second hydraulic cylinder can in one example adapted to carry out the second function. Alternatively, different cylinders can be used for carrying out the different second functions 324. Thus, the second hydraulic cylinder arrangement 325 is connected to the second implement hydraulic connection 321 for controlled supply of pressurized fluid to the second hydraulic function for control of the at least one second hydraulic function. The at least one second hydraulic function 324 may comprise a function for lifting/lowering of the implement.

In the illustrated example, at least one first sensor 317 is arranged on the implement. The at least one first sensor 317 is arranged to obtain sensor signals at least related to the at least one first hydraulic function 314', 314". The at least one first sensor 317 may comprise a sensor arranged to obtain signals related to the rotational position of the working tool in relation to the implement. The at least one first sensor may be arranged to sense a pivotal position of the working tool in relation to the implement. The at least one first sensor may comprise a radial Hall sensor. Alternatively, or in addition thereto, the at least one first sensor arranged to obtain signals related to the rotational position of the working tool in relation to the implement comprises a linear sensor. The rotational position can be calculated based on the signals obtained by the linear sensor.

Further, the at least one first sensor 317 may comprise at least one pressure sensor arranged to obtain signals related to a hydraulic pressure. The at least one a pressure sensor may be arranged to sense at least one pressure related to the first cylinder arrangement 315', 315". For example the at least one first pressure sensor comprises pressure sensors sensing the pressure of the respective chamber within at least one of the cylinders of the first hydraulic cylinder arrangement 314', 314". There is a relation between the hydraulic pressure, force exerted by the hydraulic cylinder. Further, there is a relation between the force exerted and a load at least partly carried by the cylinder. These relations can be used to obtain information related to the implement and/or a load carried by the working tool on the implement.

Instead or in addition thereto, the at least one first pressure sensor 317 comprises pressure sensors sensing the pressure in the two lines of at least one of the first hydraulic circuit(s) 313', 313". When two pressure sensors are used for obtaining signals related to a hydraulic pressure and those two pressure sensors are arranged to obtain signals related to the hydraulic pressure on both sides of the hydraulic cylinder, a difference pressure can be determined. This difference pressure defines the force exerted by the hydraulic cylinder. The effect of any back pressure or counter pressure is then accounted for.

At least one second sensor 327 may further be arranged on the implement. The at least one second sensor 327 is arranged to obtain sensor signals related to the second hydraulic function 324. The at least one second sensor 327 may comprise a sensor arranged to sense the rotational position of the implement in relation to the working vehicle. The at least one second sensor 327 may be arranged to sense a pivotal position of the implement in relation to the working vehicle. The at least one second sensor 327 may comprise a radial Hall sensor. Alternatively, or in addition thereto, the at least one second sensor arranged to obtain signals related to the rotational position of the working tool in relation to the implement comprises a linear sensor. The rotational position can be calculated based on the signals obtained by the linear sensor.

Further, the at least one second sensor 327 may comprise at least one pressure sensor arranged to obtain signals related to a hydraulic pressure. The at least one a pressure sensor may be arranged to sense at least one pressure related to a pressure of the at least one cylinder of the second hydraulic cylinder arrangement. For example the at least one second pressure sensor comprises pressure sensors sensing the pressure of the respective chamber within the cylinder. As stated above in relation to the first pressure sensor(s), there is a substantially linear relation between the pressure and the load, at least when the rotational position of the arm in relation to the working vehicle is within certain ranges, and this relation can be used to determine the load.

Instead or in addition thereto, the at least one second pressure sensor comprises pressure sensors sensing the pressure in the two lines in the second hydraulic circuit. When two pressure sensors are used for obtaining signals related to a hydraulic pressure and those two pressure sensors are arranged to obtain signals related to the hydraulic pressure on both sides of the hydraulic cylinder, a difference pressure can be determined. This has as stated above in relation to the first pressure sensor(s) the effect that a back pressure or counter pressure can be accounted for.

The implement part of the system comprises further a local control element 308. The implement part of the system comprises further a digital interface part 301 connectable to the working vehicle. The implement digital interface part 301 is connectable to the working vehicle by means of a corresponding vehicle digital interface part 302. When the digital interface parts are connected, digital communication between the working vehicle and the local control element 308 of the implement is provided. The communication can be wired or wireless or a combination thereof.

The local control element 308 is arranged to receive an operator control signal via said digital interface for operator control of the at least one first function and possibly also the second function, if present. The local control element 308 is arranged to determine a valve control signal adapted to control at least one control valve 331, 341 at the working vehicle based on said operator control signal, and to transmit said valve control signal to the digital interface 301, 302. In the illustrated example, a first 331 of the control valves controls the first hydraulic circuits 313', 313". Further, a second 341 of the control valves controls the second hydraulic circuit 323. The control valves 331, 341 will be described more in detail below.

The local control element 308 may further be arranged to obtain an additional valve control signal adapted to control operation of at least one additional control valve 316 at the implement based on said operator control signal, and to feed said valve control signal to said at least one additional control valve. The operator control signal may comprise a selector signal. The least one additional control valve 316, 516', 516" may comprise a switch valve arranged to switch between opening/closing based on the selector signal, The least one additional control valve 316, 516', 516" may comprise a selector valve arranged to select hydraulic circuit based on the selector signal.

Thereby one of the first hydraulic circuits 313', 313" can be selected for supply of pressurized fluid. As is clear from the above, the additional control valve 316 is electrically connected to the local control element.

Further, the local control element may be supplied with a power supply such as by means of a 12V or 24V battery. The signals provided from the local control element to the additional control valve(s) may then have enough power to be able to drive the additional control valve(s). No individual power signal from the working vehicle is required for each additional control valve.

The local control element 308 may further be arranged to receive the obtained sensor signals and to determine the valve control signal adapted to control at least the at least one control valve 331, 341, and possible additional control valve(s), based on the obtained sensor signals. Thus, the local control element is arranged to receive the obtained first and/or second sensor signals and to determine the valve control signal adapted to control at least the at least one control valve, and possible additional control valve(s) based on the obtained first and/or second sensor signals.

The local control element 308 comprises in one example a control module, wherein the desired output, i.e. the behaviour of the first at least one and possible second hydraulic function is based on operator input to the control module. The input to the control module may be an operator signal. Thus, the control module is then controlled by direct operator control. The direct operator control may for example be provided by means of a joystick. Alternatively, the control module is controlled by means of indirect operator control. In indirect operator control, then local control element 308 may be arranged to generate signals according to a pre-set task planning scheme for example based on operator input by means of an operator input interface such as said joystick or a display with input means. The control module may comprise a feedback loop that allows for feedback and self-correction. The operation is adjusted according to differences between the actual output as measured by the sensors and the desired output value.

Other known functions for control can be used. For example, the feed-back loop can be substituted or complemented with feed forward or model based control or open loop control.

In the illustrated example, the working vehicle part of the implement comprises a pump 353 and a fluid reservoir 352. The first vehicle control valve 331 is connected to the pump 353 and fluid reserve 352. The first vehicle control valve 331 is configured to control hydraulic fluid for the at least one first hydraulic function 314', 314". When the first implement hydraulic connection 311 is connected to the first vehicle hydraulic connection 312, hydraulic fluid is carried to the at least one first hydraulic function 314', 314" based on control from the first control valve 331. Operation of the first control valve 331 is controlled from the local control element 308 by operator control signals received over the digital interface 301, 302.

Further, the second vehicle control valve 341 may be connected to the pump 353 and fluid reserve 352. The second vehicle control valve 341 may be configured to control hydraulic fluid for the at least one second hydraulic function 324. When the second implement hydraulic connection 321 is connected to the second vehicle hydraulic connection 322, hydraulic fluid can be carried to the at least one second hydraulic function 324 based on control from the second control valve 341. Operation of the second control valve 341 is controlled from the local control element 308 by operator control signals received over the digital interface 301, 302.

Figure 10:
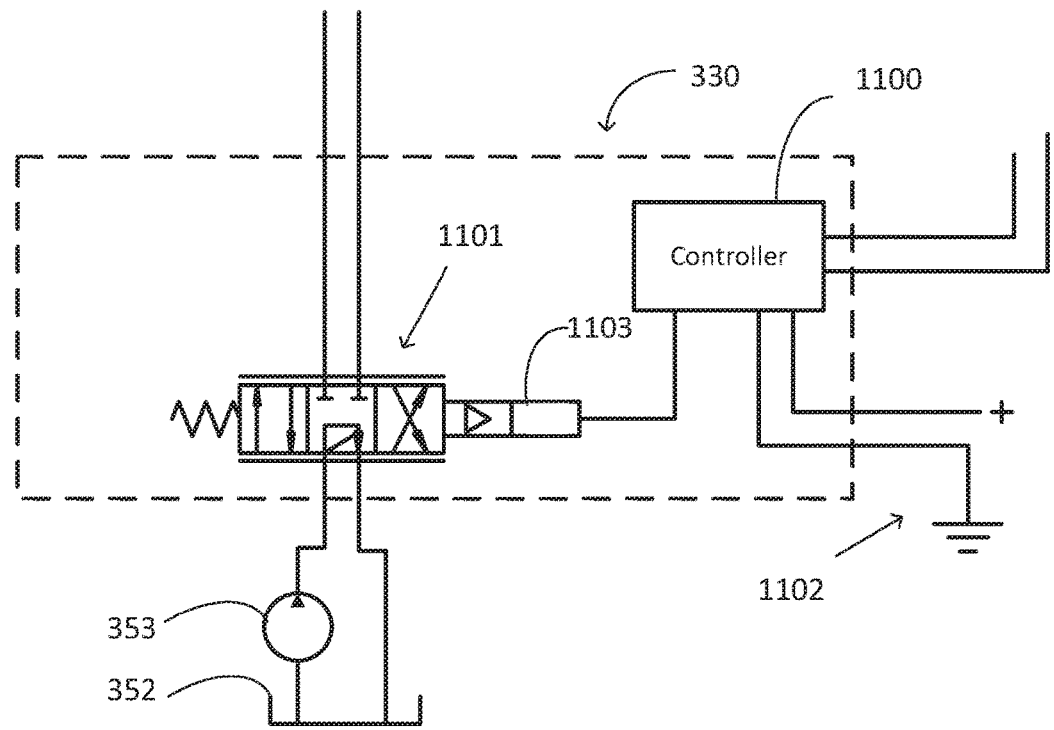
FIG. 10 is a scheme schematically illustrating an example of a regulator of or connected to a control valve according to one example.

In the illustrated example, the respective vehicle control valve 331, 341 comprises a regulator 330, 340 arranged to receive the signals received over interface and to control the action of the vehicle control valve based on the received signals. The regulator is arranged to control a direction of flow of the hydraulic fluid within the hydraulic circuit and the flow rate (m$^3$/s) of the hydraulic fluid based on the received signals. An example of a regulator is shown in FIG. 10.

In one example, the control valves 331, 341 are general purpose vehicle control valves adapted to support the hydraulic functions of the working vehicle. In accordance one or more additional hydraulic consumers (not shown) are connected to a hydraulic circuit fed by the hydraulic fluid by means of said general purpose vehicle control valves. When the implement is installed at a working vehicle where pre-installed or general purpose vehicle control valves, a gateway can be provided for directing the valve control signals from the local control element to the vehicle control valve(s). This may involve that the gateway is arranged to override functions in the working vehicle for controlling the first and possible second hydraulic functions.

In the illustrated example the gateway is implemented at a vehicle control element 354. The vehicle control element 354 is characteristically a distributed system of control nodes arranged to communicate with each other by means of a digital data bus.

The local control element may be connected to the gateway, or vehicle control element either via the digital interface or via a separate analogue or digital communication line (not shown) between the local control element and gateway, or vehicle control element 354.

Alternatively the vehicle control valves are control valves dedicated for control of hydraulic functions of the implement or working tool(s) attached thereto. In accordance with this example, the working vehicle can be clean from devices for control of implement, when the working vehicle is not provided with an implement. When an implement is to be attached to the working vehicle, the dedicated control valves are mounted to the pump and reserve of the working vehicle and the implement is mounted to the working vehicle.

In the illustrated example, the control valves are mounted at the vehicle part of the arrangement. However, the hydraulic connection(s) 311, 312, 321,322 may instead be arranged between the control valve(s) 331, 341 at one hand, and the pump 353 and hydraulic reserve 352 at the other hand. The control valve(s) may then be arranged at the implement.

The vehicle control valves for control of the implement can in accordance with these examples with dedicated control valves be adapted for control of the implement functions. No adaptations to other possible hydraulic consumers (having other requirements) are necessary. Further, the function of the local control element for control of the vehicle control valves is adapted to the implement on which it is mounted. Further, the function of the local control element for control of the vehicle control valves may also be adapted to the characteristics of the vehicle control valve(s) it is adapted to control The valve control signals for control of the first and possible second control valves 331, 341 may as stated above be received over the digital interface 301, 302. Alternatively the valve control signal is transmitted to the control valve over a separate line. This would characteristically involve that the signal is transmitted to the control valve via the gateway. The vehicle part of the system comprises a channel for communication of the valve control signals from the digital interface or gateway to the first and possible second control valve 331, 341. The channel is a digital channel. The digital channel is in one example a wireless channel. The digital channel is in one example a wired channel. The communication of signals may be performed by way of a digital data bus. Said digital data bus connects characteristically a plurality of nodes within the working vehicle. The communication over the digital channel, or data bus, is performed in accordance with a communication protocol. For example the communication may be by way of CAN.

The working vehicle part comprises further an operator interface 309 for operator control of at least the at least one first hydraulic function. The operator interface 309 is arranged to communicate with the digital interface. The vehicle part of the system comprises a channel for communication of the operator control signals to the digital interface. The channel is in one example a digital channel. The digital channel is in one example a wireless channel. The digital channel is in one example a wired channel. The signals may be communicated, as stated above, by way of a digital data bus. Said digital data bus connects as stated above characteristically a plurality of nodes within the working vehicle. The communication over the digital channel, or data bus, is performed in accordance with a communication protocol. For example the communication may be by way of CAN.

The gateway may be arranged to direct signals from the operator interface intended for the local control element to said local control element via the digital interface.

Further, the operator interface obtaining operator signals to the local control element may be a general purpose operator interface adapted for user control of other functions than the at least one first hydraulic function and possible second function. In accordance with these embodiments, when the implement is installed at a working vehicle pre-installed or general purpose vehicle interface(s) are to be used, the gateway can be provided for directing the operator control signals from the operator interface intended for the local control element to said local control element via the digital interface. This may involve that the gateway is arranged to override transfer of the operator control signals to other functions working vehicle. Further, the gateway can be provided for directing state parameter signals and other signals obtained by the local control element to the operator interface. This may involve that the gateway is arranged to override transfer of signals from other functions of the working vehicle to the operator interface.

In the illustrated example the gateway is as stated above implemented at a vehicle control element 354, which characteristically is distributed system of control nodes arranged to communicate with each other by means of a digital data bus.

The gateway, or vehicle control element is arranged to direct the operator control signals to the local control element via the digital interface.

In one example, the digital interface comprises a contactless interface device or probe to probe or recover information from a CAN network of the working vehicle. The contactless probe is arranged to monitor the traffic on the CAN network and to recover signals or messages having predetermined characteristics. The contactless probe may be arranged to recover signals exchanged on the data bus comprising at least the operator control signal.

In this way, the implement becomes even more flexible to be mounted to virtually any working vehicle. Implements with advanced control functionality can be mounted to any working vehicle having a CAN network. This contactless interface is suitable for aftermarket installation without any effect on the integrity of the working vehicle. For example, this contactless interface is particularly well suited for attachment to pre-owned working vehicles.

As working vehicles such as agricultural tractors today are commonly equipped with distributed electronic control systems, using CAN bus technology to link the different Electronic Control Units of the subsystems together, there is in order to manage the control of the working vehicle, a multitude of different information broadcasted on the CAN network, e.g. sensor data, user input from joysticks and switches, and different data regarding operation of the working vehicles.

Most implements traded are not delivered from factory together with the working vehicle. A more common situation is that the implement for a working vehicle is attached to the working vehicle as a dealer install option. Similarly as with the working vehicles, the control of implements are becoming more advanced, in order to increase the work efficiency and to the convenience for the drivers. This puts increased demand on the information required to control the implements. The use of the contactless interface allows for accessing different sort of information available in the working vehicle data bus. The accessed information can be used to control the implement and/or to provide more powerful functions.

Apart from accessing information related to operator control signals for control of the implement, there is a long list of examples where access of information allows for integration of new functions. The implement functions requiring data from the working vehicle network may include (but not be limited to):

Status of hitch to make sure that implement is not active while operating front or rear hitch.

Status of seat switch for safety purposes, i.e. to make sure that the operator is seated while operating the implement Information on time to next working vehicle service to suggest implement service actions Information of ground speed or velocity for safety functions at high speed The contactless probe comprises a processor connected to a power supply such as a battery. The contactless probe comprises further one or two or more connection clips. When using two connection clips, the first connection may be installed on the line of rising pulse signals. The second connection may be installed on the line of descending pulse signals. The connections are made by clips without contact thus without wire connection, intended to recover the signals exchanged on the digital data bus. The clips may be arranged to ensure coupling of the capacitive type.

The operator interface comprises an operator input element such as a joystick 355. The operator interface may also comprise a display 356. The display may be a touchscreen display. The display 356 may be arranged to display information related at least to the at least one hydraulic function based on information obtained by the local control element 308 and communicated over the communication channel between the digital interface and operator interface.

The joystick and the display may be arranged to communicate with each other. A communication channel may be a digital channel. The digital channel is in one example a wireless channel. The digital channel is in one example a wired channel. The communication over the digital channel is performed in accordance with a communication protocol. For example the communication may be over CAN.

The vehicle control element 354 is adapted for control of vehicle functions.

In FIG. 10 a vehicle control valve comprises a regulator 330. The regulator 330 is arranged to receive valve control signals received from a local control element and to control the action of the vehicle control valve based on the received valve control signals. The regulator 330 is arranged to control a direction of flow of the hydraulic fluid within the hydraulic circuit(s) and the flow rate ($m^3$/s) of the hydraulic fluid based on the received valve control signals.

In the illustrated example, a controller 1100 of the regulator 330 is arranged to receive the valve control signals from the local control element either via the digital interface or as an analogue signal. The controller 1100 is arranged to control the flow rate and a flow direction based on the received valve control signals. The controller 1100 is powered by a power source 1102 and outputs higher power control signals to an actuator 1103 based on the low power input valve control signals. The actuator in turn controls a proportional valve 1101. The proportional valve is in the illustrated example a bi-directional proportional control valve.

The actuator is for example an electrical motor or a solenoid. The solenoid can be directly connected to the proportional valve. Alternatively, the solenoid is indirectly connected to the proportional valve via a hydraulic circuit. Hence, the proportional valve may be an electrohydraulic valve or a direct operated valve. The proportional valve is in the illustrated example an open center valve. However, it may instead be a closed center valve. The proportional valve is connected to a pump 353 and fluid reserve 352.

The valve control signals received by the regulator 1100 are determined by the local control element. This will be discussed more in detail in relation to Figure In FIG. 4, a hydraulic and electric circuit diagram 400 for control of an implement and a working tool attached thereto is illustrated. The hydraulic and electric diagram of FIG. 4 corresponds to that of FIG. 3 with the addition that the implement further comprises a digital working tool interface 411, 412 for communication with at least one working tool sensor 437 and/or a local working tool control element 418 at a working tool, when the digital working tool interface 411, 412 is connected to the local control element.

The digital working tool interface 411, 412 may be arranged to communicate wirelessly with the at least one working tool sensor 437 and/or a local working tool control element 418 at the working tool. The digital working tool interface 411, 412 may be arranged to communicate with the at least one working tool sensor 437 and/or a local working tool control element 418 by way of a digital channel. As stated above, the digital channel can be a wireless channel or a wired channel. The communication over the digital channel is performed in accordance with a communication protocol. For example the communication may be over CAN.

Alternatively, the at least one working tool sensor 437 may be analogously connected to the local control element of the implement.

In different embodiments (not shown), the implement is configured to carry hydraulic fluid—to at least one third hydraulic function at the working tool. The implement may be arranged to carry hydraulic fluid for example from a third hydraulic connection to the at least one third hydraulic function at the working tool. In one example the local working tool control element 418 is arranged to control said third hydraulic function. Accordingly, the local working tool control element 418 is arranged to form a valve control signal based on an operator control signal received via the digital working tool interface, and to transmit said valve control signal to the digital interface 411, 412 for further communication to the control valve at the working vehicle which controls the at least one third hydraulic function.

In different embodiments, the local working tool control element 418 is arranged to receive sensor signals from the at least one working tool sensor 437. In one example, the local working tool control element 418 is arranged to transmit the received sensor signal to the working tool digital interface 411, 412. Alternatively, the local working tool control element 418 is arranged to calculate a state parameter related to the working tool based on the received sensor signals and to feed the calculated state parameter to the working tool digital interface 411, 412.

In the illustrated example, the digital interface between the implement and the working tool is described as an implement digital interface part 412 and a working tool digital interface part 411 connectable to the implement part 412. When the digital interface parts are connected, digital communication between the local working tool control element 418 and/or the working tool sensors 437, and the local control element 308 is provided.

Figure 5:
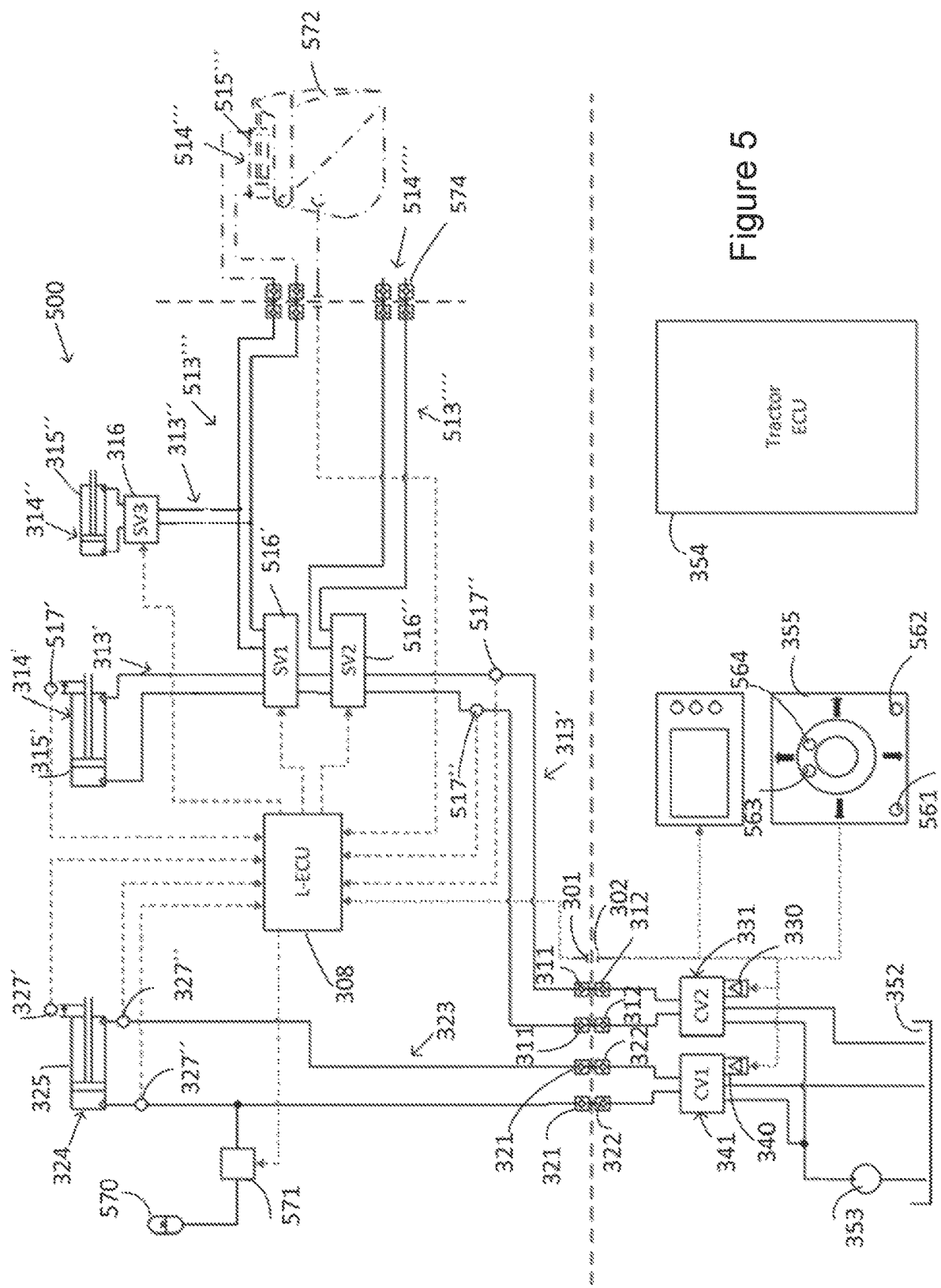
FIG. 5 illustrates a third hydraulic/electric circuit diagram for controlling an implement according to a third example.

In FIG. 5, a hydraulic and electric circuit diagram 500 for control of an implement of a working vehicle is illustrated.

The hydraulic and electric circuit diagram 500 is arranged for controlling at least one vehicle control valve based on operator control signals. The diagram comprises parts located on the working vehicle and parts located on the implement. A dashed line horizontally dividing the Figure in two parts shows an example of which parts can be located on the working vehicle and which parts can be located on the implement. The hydraulic and electric diagram of FIG. 5 corresponds to that of FIG. 3. However, some additional features are disclosed in FIG. 5.

In the illustrated example, the implement part comprises a first hydraulic connection 311 connectable to the working vehicle. The first implement hydraulic connection 311 is connectable to the working vehicle by means of a corresponding first vehicle hydraulic connection 312. First hydraulic circuits 313', 313", 513''', 513'''' are when the first implement hydraulic connection 311 is connected to the corresponding first vehicle hydraulic connection 312 configured to carry hydraulic fluid via said first hydraulic connections 311, 312 to a plurality of first hydraulic functions 314', 314", 314", 314". In the illustrated example the first functions 314', 314", 514", 514"" are carried out by means of actuation of a first hydraulic cylinder arrangement 315', 315", 515". Thus, the first hydraulic cylinder arrangement 315', 315", 515" is connected to the first implement hydraulic connection 311 for supply of pressurized fluid to the first hydraulic functions. A plurality of switch valves 316, 516', 516" controls the supply of pressurized fluid over selected first hydraulic circuits 313', 313", 513", 513" to the respective hydraulic cylinder of the hydraulic cylinder arrangement 315', 315", 515".

In the illustrated example, the first hydraulic circuits 313', 313", 513", 513"" are connected to a first control valve 331. One first hydraulic circuit 313' comprises a first cylinder or first pair of cylinders 315'. The first cylinder 315' is used to move a working tool attached to the front loader such as a bucket, or hay grab. A further hydraulic consumer (not shown) such as a hydraulic cylinder may alternatively be connected to the first hydraulic circuit 313' when the front loader is not being used. The not shown consumer is connected to the first hydraulic circuit 313' by an additional circuit (not shown).

The first hydraulic circuits 313', 313", 513", 513" comprise in the illustrated example further first hydraulic circuits 513", 513"" connectable to the control valve 331 by respective switch valves 516', 516". The switch valves 516', 516 may be integrated into one single valve. The further first hydraulic circuits 513''', 513"" are connectable to consumers 572, 574 respectively which may be needed, for example to control a grab bucket, or a bucket with a pivotable beater as described above.

Yet a further first hydraulic circuit 313" is connected to a consumer or hydraulic cylinder 315" via switch valve 516'. The yet further first circuit 313" is provided with a further switch valve 316. The yet further first hydraulic circuit 313" may be used, for example to control locking means for connecting the implement to the working tool to make attachment of the working tool to the implement easy. The locking means is for example hydraulically controlled by a hydraulic cylinder. The locking means is for example electrically controlled by an electric actuator.

Further first hydraulics circuits could be connected the first control valve 331 by further switch means.

The implement part comprises further in the illustrated example a second hydraulic connection 321 connectable to the working vehicle. The second implement hydraulic connection 321 is connectable to the working vehicle by means of a corresponding second vehicle hydraulic connection 322. A second hydraulic circuit 323 is when the second implement hydraulic connection 321 is connected to the corresponding second vehicle hydraulic connection 322 configured to carry hydraulic fluid via said first hydraulic connections 321, 322 to at least one second hydraulic function 324. In the illustrated example the at least one second function 324 is carried out by means of actuation of a second hydraulic cylinder arrangement 325. When there are more than one second function, a common second hydraulic cylinder can in one example adapted to carry out the second function. Alternatively, different cylinders can be used for carrying out the different second functions 324. Thus, the second hydraulic cylinder arrangement 325 is connected to the second implement hydraulic connection 321 for supply of pressurized fluid to the second hydraulic function for control of the at least one second hydraulic function. The at least one first hydraulic function 324 may comprise a function for lifting/lowering of the implement.

The second hydraulic circuit 323 with the second hydraulic cylinder or pair of cylinders 325 connects to a second control valve 341 via the second hydraulic connection 321, 322. Thus, the fluid flow through the second hydraulic circuit 323 is regulated by the second control valve 341. The hydraulic cylinder 325 is used to lift and lower the arm of the implement.

Further, a damping circuit 570 with valve 571 is in the illustrated example connected to the second hydraulic circuit 323.

An operator interface comprises an operator input element 355 for operator control of at least some of the hydraulic functions. The operator interface is arranged to communicate with a digital interface 301, 302. The operator input element 355 comprises for example a joystick. The operator input element 355 comprises in the illustrated a lever 560. In the illustrated example, the operator input element comprises further selector means 561, 562, 563, 564. The lever 560 may be a cross gate lever which can be moved in four directions (forwards and backwards along a first axis and left and right along a perpendicular second axis) about a central, neutral position. The selector means 561, 562, 563, 564 may be, for example buttons or switches which can be activated whilst the driver moves lever 560. Some of the selector means 561, 562 may be provided on the base of the operator input element.

In different embodiments, control by means of the operator input element 355 can be performed such that when it is desired to move a working tool by changing the flow direction in cylinder 315', the cross gate lever 355 can be moved to the left and right. In this position the switch valves 516', 516" are in a position so that fluid flows from and to the fluid reserve 352 to cylinder 315' and switch valve 316 is closed. When it is desired to activate consumer 572, selector means 563 on lever 560 which controls switch valve 516' can be pushed and cross gate lever moves left and right. In this instance fluid flows to and from the fluid reserve 575 to consumer 572. When it is desired to activate consumer 574, selector means 564 is pushed which controls 516" and the cross gate lever 560 is moved in a predetermined direction. In this situation fluid flows to and from the fluid reserve 352 to consumer 574. To activate hydraulic cylinder 315", using the first circuit 313", button 562 can be pushed and thereby alter between first hydraulic circuits 313' and first hydraulic circuit 313".

The damping circuit 570 is controlled by the operator input element 355 by pressing selector means 561. The damping circuit provides damping to the implement when moving over rough ground.

In the illustrated example, a first position sensor 517' is arranged on the implement. The first position sensor 517' is arranged to obtain signals relating to the position of the hydraulic cylinder. The first position sensor 517' may be a linear sensor. The first position sensor 517' may be arranged to sense a position of a piston of the hydraulic cylinder. A rotational position can be calculated based on the signals obtained by the linear sensor. Alternatively, or in addition thereto, the first position sensor 517' may comprise a rotary position sensing sensor. The rotary position sensing sensor may be arranged to sense a rotational position related to the first hydraulic circuits.

Further, one or a plurality of first pressure sensors 517" are arranged to sense a pressure related to the first hydraulic circuits.

In the illustrated example, two pressure sensors are arranged at the respective line of the first hydraulic circuits directly after the hydraulic connection 311. Thereby, signals related to the hydraulic pressure on both sides of the pressurized hydraulic cylinder can be used to determine a difference pressure.

When two pressure sensors are used for obtaining signals related to a hydraulic pressure and those two pressure sensors are arranged to obtain signals related to the hydraulic pressure on both sides of the hydraulic cylinder, a difference pressure can be determined. This difference pressure defines the force exerted by the hydraulic cylinder. The effect of any back pressure or counter pressure is then accounted for.

In the illustrated example, a second position sensor 527' is arranged on the implement. The second position sensor 527' is arranged to obtain signals relating to the position of the hydraulic cylinder. The second position sensor 527' may be a linear sensor. The second position sensor 527' may be arranged to sense a position of a piston of the hydraulic cylinder. A rotational position can be calculated based on the signals obtained by the linear sensor Alternatively, or in addition thereto, the second position sensor 527' may comprise a rotary position sensing sensor. The rotary position sensing sensor may be arranged to sense a rotational position related to the first hydraulic circuits.

Further, one or a plurality of first pressure sensors 527" are arranged to sense a pressure related to the first hydraulic circuits. This has as stated above the effect that any back pressure or counter pressure is accounted for.

In the illustrated example, two pressure sensors are arranged at the respective line of the second hydraulic circuits directly after the hydraulic connection 321. Thereby, signals related to the hydraulic pressure on both sides of the pressurized hydraulic cylinder can be used for determining a difference pressure. Alternatively, the second pressure sensor(s) 527" obtain signals related to the hydraulic pressure at the lifting side of the hydraulic The implement part of the system comprises further a local control element 308. The implement part of the system comprises further a digital interface part 301 connectable to the working vehicle. The implement digital interface part 301 is connectable to the working vehicle by means of a corresponding vehicle digital interface part 302. When the digital interface parts are connected, digital communication between the working vehicle and the local control element 308 of the implement is provided.

The local control element 308 is arranged to receive an operator control signal via said digital interface for operator control of the first functions and the second function. The local control element 308 is arranged to determine a valve control signal adapted to control at least one vehicle control valve 331, 341 at the working vehicle based on said operator control signal, and to transmit said valve control signal to the digital interface 301, 302.

The local control element 308 may further be arranged to obtain an additional valve control signal adapted to control the switch valves 316, 516', 516" at the implement based on said operator control signal, and to feed said additional valve control signal to said implement switch valves. The operator control signal may comprise a selector signal. The least one additional control valve 316, 516', 516" may comprise a switch valve arranged to switch between opening/closing based on the selector signal.

The least one additional control valve 316, 516', 516" may comprise a selector valve arranged to select hydraulic circuit based on the selector signal. Thereby one of the first hydraulic circuits 313', 313" can be selected for supply of pressurized fluid. As is clear from the above, the additional control valve 316 is electrically connected to the local control element.

Further, the local control element may be supplied with a power supply such as by means of a 12V or 24V battery. The signals provided from the local control element to the additional control valve(s) may then have enough power to be able to drive the additional control valve(s). No individual power signal from the working vehicle is required for each additional control valve.

The local control element 308 may further be arranged to receive the obtained sensor signals and to determine the valve control signal adapted to control at least the at least one vehicle control valve 331, 341, and possible implement switch valve(s), based on the obtained sensor signals. Thus, the local control element is arranged to receive the signals obtained from the first position sensor 517', the first pressure sensors 517", the second position sensor 527' and the second pressure sensors 527" and to determine the valve control signal adapted to control at least the at least one vehicle control valve, the possible additional valve control signal adapted to control implement switch valve(s) based on the obtained sensor signals. Thus, the first position sensor 517', the first pressure sensors 517", the second position sensor 527' and the second pressure sensors 527' are electrically connected to the local control element.

In the illustrated example, the working vehicle part of the implement comprises a pump 353 and a fluid reserve 352. The first vehicle control valve 331 is connected to the pump 353 and fluid reserve 352. The first vehicle control valve 331 is configured to control hydraulic fluid to the first hydraulic functions 314', 314", 514''', 514"". When the first implement hydraulic connection 311 is connected to the first vehicle hydraulic connection 312, hydraulic fluid is carried to the first hydraulic function 315', 315", 515''', 515"" based on control from the first control valve 331. Operation of the first control valve 331 is controlled from the local control element 308 by signals received over the digital interface 301, 302.

Further, the second vehicle control valve 341 may be connected to the pump 353 and fluid reserve 352. The second vehicle control valve 341 may be configured to control hydraulic fluid to the at least one second hydraulic function 324. When the second implement hydraulic connection 321 is connected to the second vehicle hydraulic connection 322, hydraulic fluid is carried to the at least one second hydraulic function 324 based on control from the second control valve 341. Operation of the second control valve 341 is controlled from the local control element 308 by signals received over the digital interface 301, 302.

The valve control signals for control of the first and possible second control valve are as stated above received over the digital interface or interface parts 301, 302. The vehicle part of the system comprises a channel from communication of the valve control signals to the first and possible second control valve 331, 341. The channel is in one example a digital channel. The digital channel is in one example a wireless channel. In one example the digital interface communicates with the first control valve and possible second control valve 331, 341 by way of a CAN bus.

The operator interface comprises further a display 356. The display 356 can display implement or implement control related information received via the digital interface from the implement control implement 308. The display may be a display with input means.

The working vehicle part comprises further a vehicle control element 354 for control of vehicle functions.

Figure 6:
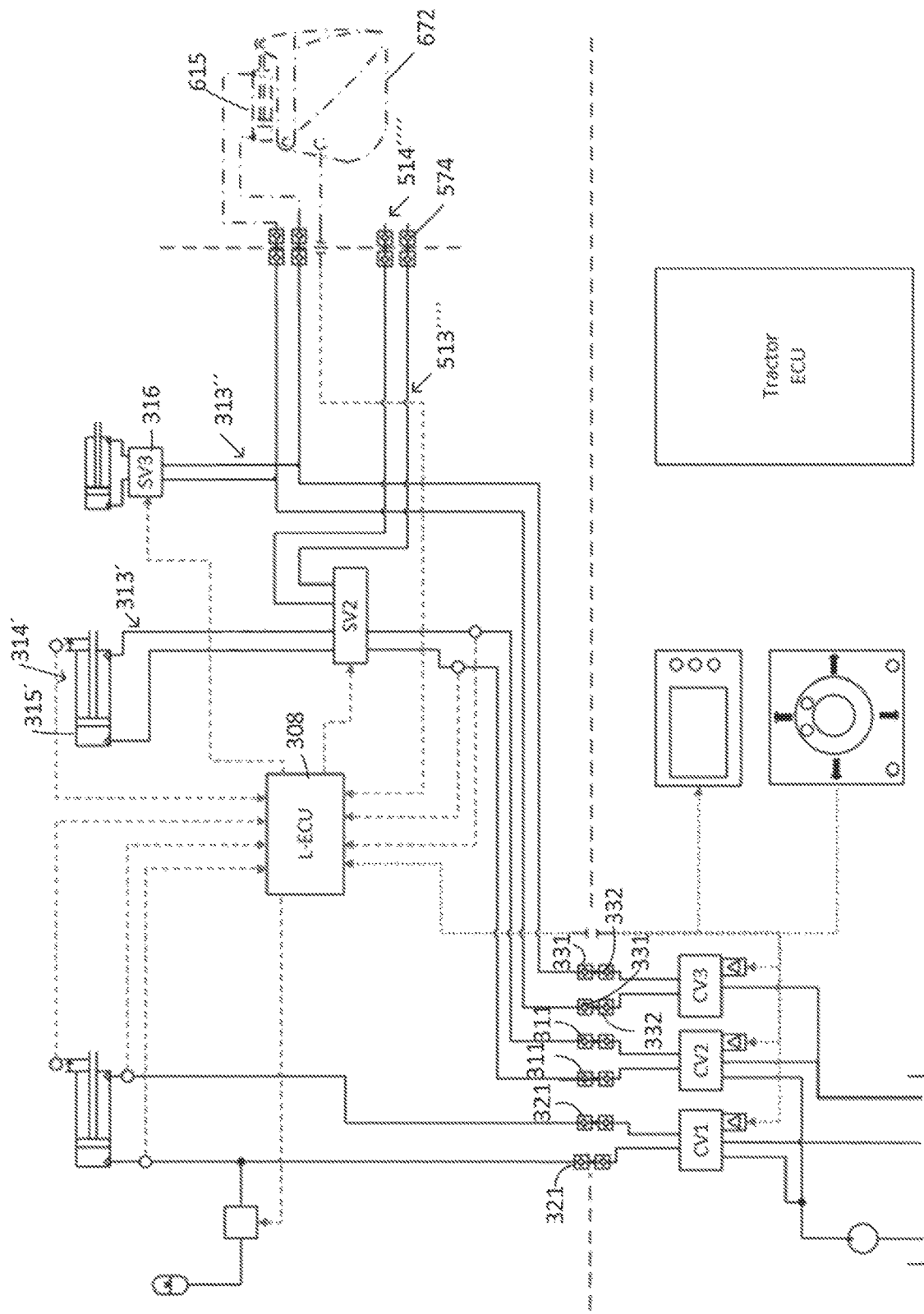
FIG. 6 illustrates a fourth hydraulic/electric circuit diagram for controlling an implement according to a fourth example.

In FIG. 6, a hydraulic and electric circuit diagram 600 for control of an implement of a working vehicle is illustrated.

The hydraulic and electric circuit diagram 600 is arranged for controlling at least one vehicle control valve based on operator control signals. The diagram comprises parts located on the working vehicle and parts located on the implement. A dashed line horizontally dividing the Figure in two parts shows an example of which parts can be located on the working vehicle and which parts can be located on the implement. The hydraulic and electric diagram of FIG. 6 corresponds to that of FIG. 5. However, some parts are different; the different parts disclosed in FIG. 6 are enlightened below.

As is discussed in relation to FIG. 5, the implement part comprises a first hydraulic connection 311 connectable to the working vehicle. The first implement hydraulic connection 311 is connectable to the working vehicle by means of a corresponding first vehicle hydraulic connection 312. A first hydraulic circuit 313' is when the first implement hydraulic connection 311 is connected to the corresponding first vehicle hydraulic connection 312 configured to carry hydraulic fluid via said first hydraulic connections 311, 312 to a plurality of first hydraulic functions 314', 314", 514"". In the illustrated example some of the first functions 314', 314", 514"" are carried out by means of actuation of a first hydraulic cylinder arrangement 315', 315'. Thus, the first hydraulic cylinder arrangement 315', 315", 515''' is connected to the first implement hydraulic connection 311 for supply of pressurized fluid to the first hydraulic functions. A plurality of switch valves 316, 516' controls the supply of pressurized fluid to the respective hydraulic cylinder of the hydraulic cylinder arrangement 315', 315".

In the illustrated example, the first hydraulic circuits 313', 313', 513"" are connected to a first control valve 331. One first hydraulic circuit 313' comprises a first cylinder or first pair of cylinders 315'. The first cylinder 315' is used to move a working tool attached to the front loader such as a bucket, or hay grab.

The first hydraulic circuits 313', 313", 513"" comprise in the illustrated example a further first hydraulic circuit 513"" connectable to the control valve 331 by switch valve 516'. The further first hydraulic circuit 513"" is connectable to consumer 574 which may be needed, for example to control a grab bucket, or a bucket with a pivotable beater as described above.

Yet a further first hydraulic circuit 313" is connected to a consumer or hydraulic cylinder 315" in parallel to the hydraulic circuit 313'. The yet further first circuit 315" is provided with a switch valve 316. The yet further first hydraulic circuit 315' may be used, for example to control an automatic locking means for connecting the implement to the working tool to make attachment of the working tool to the implement easy.

The implement part comprises further in the illustrated example a third hydraulic connection 331 connectable to the working vehicle. The third implement hydraulic connection 331 is connectable to the working vehicle by means of a corresponding third vehicle hydraulic connection 332. A third hydraulic circuit 333 is when the third implement hydraulic connection 331 is connected to the corresponding third vehicle hydraulic connection 332 configured to carry hydraulic fluid via said third hydraulic connections 331, 332 to a third function 672. In the illustrated example the third function is carried out by means of actuation of a third hydraulic cylinder arrangement 615.

The implement part comprises further, as is also discussed in relation to FIG. 5 a second hydraulic connection 321 connectable to the working vehicle. The second implement hydraulic connection 321 is connectable to the working vehicle by means of a corresponding second vehicle hydraulic connection 322. A second hydraulic circuit 323 is when the second implement hydraulic connection 321 is connected to the corresponding second vehicle hydraulic connection 322 configured to carry hydraulic fluid via said first hydraulic connections 321, 322 to at least one second hydraulic function 324. This is further described in relation to FIG. 5.

The control interface comprises an operator input element 355. The operator interface comprises further a display 356. The display 356 can display implement or implement control related information received via the digital interface from the implement control implement 308.

The working vehicle part comprises further a vehicle control element 354 for control of vehicle functions.

In FIG. 7 an example of an implement system 700 is illustrated. The Implement system 700 comprises a digital interface 701 to a working vehicle and a local control element 708. The implement system may also comprises one or a plurality of sensors 717, 727.

The local control element 708 comprises a valve control element 794. The valve control element 794 of the local control element 308 is arranged to receive an operator control signal via the digital interface 701 for operator control of at least one first hydraulic function. The valve control element 794 is arranged to determine a valve control signal adapted to control at least one control valve based on said operator control signal, and to transmit said valve control signal to the at least one control valve. Below examples of designs of the valve control element are described in relation to FIG. 11.

The local control element 708 may be arranged to, among other things, calculate a state parameter related to the implement based on the obtained sensor signals and to feed the calculated state parameter to the digital interface 701. The digital interface 701 arranged to feed the calculated state parameter to the work vehicle, for example to an operator interface of the work vehicle.

The local control element may comprise a position determining element 790.

In one example, the at least one hydraulic function of the implement comprises a movement of a tool in relation to the implement, and the at least one sensor comprises a sensor arranged to obtain signals relating to the rotational position of the working tool in relation to the implement. The position determining element 790 may then be arranged to calculate a first state parameter related to the position and/or velocity and/or acceleration of the tool in relation to the implement. The first state parameter may comprise relative position of the working tool in relation to the implement. The position determining element 790 may then be arranged to calculate the relative position based on the obtained sensor signal relating to the rotational position of the tool in relation to the implement and based on a maximum rotational position of the tool in relation to the implement. Thus, the relative position may be a percentage of maximum rotation. The rotational position of the tool in relation to the implement may be given as a tilt angle. The maximum rotational position is characteristically known for example by measurements. The implement and/or working tool have information related to the maximum rotational position.

In one example, the at least one hydraulic function of the implement comprises movement of the implement in relation to the work vehicle, and the at least one sensor is arranged to obtain sensor signals relating to the rotational position of the implement in relation to the work vehicle. The position determining element 790 may then be arranged to calculate a second state parameter relating to the position and/or velocity and/or acceleration of the implement in relation to the work vehicle. Thus, the relative position may be a percentage of maximum rotational position. The rotational position of the tool in relation to the work vehicle is to be understood as a height and orientation of the implement in relation to the work vehicle. The implement has information related to the maximum rotational position. The maximum rotations position is characteristically known for example by measurements. An example of this is discussed below.

The position determining element 790 may be arranged to calculate a third state parameter related to the position (i.e. orientation and height) and/or velocity and/or acceleration of the working tool in relation to the work vehicle. The position determining element 790 is then arranged to calculate the position of the working tool in relation to the work vehicle based on the obtained sensor signals relating to the rotational position of the implement in relation to the work vehicle, based on the obtained signals relating to the rotational position of the working tool in relation to the implement and based on geometrical calculations. The implement has characteristically information about its dimensions and geometry. This can be used in determining the position of the working tool in relation to the work vehicle.

The local control element 708 may further be arranged to comprise a pressure determining element 799. The pressure determining element 799 is arranged to receive at least one pressure signal obtained by at least one pressure sensor, wherein at least one of the sensors 717, 727 are pressure sensors arranged to obtain signal(s) related to hydraulic pressure(s) in one or more hydraulic circuits of the implement. Different ways of obtaining hydraulic pressures are for example disclosed herein. The pressure determining element 799 is arranged to calculate at least one fourth state parameter related to the hydraulic pressure or a pressure change related to at least one hydraulic function of the implement and/or working tool attached thereto.

In one example, the pressure determining element 799 may be arranged to calculate the fourth state parameter as a relative hydraulic pressure based on the obtained signal related to the hydraulic pressure and based on a maximum pressure. The maximum pressure is characteristically a maximum system pressure of a hydraulic cylinder of the hydraulic circuit in which the hydraulic pressure is obtained by means of the pressure sensor. The implement has information related to the maximum pressure(s). The maximum hydraulic pressure(s) are characteristically known for example by measurements. An example of this is discussed below.

The local control element 708 may further comprise a load weight determining element 793. The load weight determining element 793 is arranged to calculate a fifth state parameter related to a weight of a load carried by a working tool attached to the implement. The load weight determining element 793 is arranged to calculate the load weight based on a known relation between the load weight and the hydraulic pressure and based on the signal obtained by the pressure sensor. The obtained hydraulic pressure may relate to a hydraulic pressure in the hydraulic circuit(s) and or hydraulic cylinder(s). The known relationship is measured or calculated, or a combination thereof. The known relation may be determined based on geometrical calculations and/or a calibration process.

The load weight determining element 793 may be arranged to record an obtained hydraulic pressure related to the lifting cylinders during lift of the load. The load weight determining element is then arranged to determine the load weight based on the recorded pressures during the lift.

The load weight determining element 793 is in one example arranged to obtain signals relating to the rotational position of the implement in relation to the work vehicle, to obtain signals relating to the rotational position of the tool in relation to the implement, to obtain signals relating to the hydraulic pressure, and to calculate the fifth state parameter related to the weight of the load carried by the working tool based on said obtained sensor signals.

The local control element may be arranged to determine whether the calculated at least one state parameter fulfils pre-set requirement(s) and when the pre-set requirement(s) are not fulfilled, obtain an implement status report informing that the calculation of the state parameter does not fulfil pre-set requirements to the digital interface. The implement status report may comprise information related to which pre-set requirement is not fulfilled. The local control element may be arranged to refrain from feeding the calculated at least one state parameter to the digital interface when the pre-set requirements are not fulfilled.

The local control element 708 may further comprise a calibration element 792.

The local control element 708 further comprises a monitoring element 791. The monitoring element 791 is arranged to form a sixth state parameter related to the operational status of the implement. The operational status of the implement may be an adaptive service reminder. The monitoring element may be arranged to monitor the signals obtained by the sensors 717, 727 and to form the sixth state parameter based on the monitoring of the signals obtained by the sensors. For example, the monitoring element may be arranged to form the sixth state parameter when at least one of the sensor signals has exceeded a predetermined value for a predetermined amount of time.

Alternatively or in addition thereto, the local control element may be arranged to receive working vehicle related signals or messages for example by means of the digital interface 701. The monitoring element 791 may then be is arranged to form the sixth state parameter related to the operational status of the implement based on the received working related signals or messages. The working vehicle related signals or messages may comprise:

information on time to next working vehicle service and/or information related to operational time of the working vehicle and/or components therein and/or information on working vehicle ground speed/velocity and/or information on engine speed/velocity For example, the digital interface may comprise a contactless probe for connection to a digital data bus of the working vehicle. The contactless probe may be arranged to monitor the traffic on the digital data bus and to recover said working vehicle related signals or messages.

Alternatively or in addition thereto, the working vehicle related signals received over the digital interface may be directed to the digital interface from a gateway of the working vehicle. The gateway may for example be implemented at a vehicle control element, wherein the vehicle control element characteristically is a distributed system of control nodes arranged to communicate with each other by means of a digital data bus.

The monitoring element 791 is arranged to feed the sixth state parameter related to the operational status of the implement to the digital interface 701. The digital interface 701 arranged to feed the sixth state parameter to the working vehicle, for example to an operator interface of the working vehicle.

To sum up, the monitoring element 791 is arranged to feed the operational status report to the digital interface. The operational status report may comprise information related to the cause of the implement status report. The operational status report may also comprise information related to actions required for remedying the cause of the implement status report. For example, the implement status report may be in the form of the service reminder.

In the illustrated example, the local control element 708 comprises a task planning element 1295. The task planning element 1295 is arranged to request valve control in accordance with the operator input. The operator input is received in the form of an operator control signal via the work vehicle digital interface. The task planning element may further be arranged to identifying which state parameters to be calculated and when based on operator input from an operator interface. The operator control signal may comprise a request for at least one state parameter and/or valve control. The task planning element is arranged to handle this request and obtain the requested state parameter(s) and/or valve control. The obtained state parameters are then fed via the digital interface to the operator display. The operator input may comprise task selection. The task selection may comprise a selection of for example position determination, pressure determination, load weight determination, valve control, calibration etc. Thus, each task is at least partly related to one or more state parameters and/or valve control. Further, the operator input may comprise additional operator input related to the specific task.

The task planning element 1295 is arranged to feed the request to the valve control element. The task planning element 1295 may be arranged to feed the request to those calculating elements, such as the position determining element 790, the load weight determining element 793, the pressure determining element 799 etc., arranged to calculate state parameters associated with the specific task. The task planning element 1295 may be arranged to continuously request updated calculations of the state parameter from the calculating elements. The updating frequency may be set based on the requirements and/or dynamics of the specific task. The updating frequency may further be set based on available processor capacity and/or bandwidth for transmission. The task planning element may be arranged to combine state parameters from a plurality of state calculating elements and to feed the combined state parameters to the digital interface. The digital interface then transmits the state parameter or combined state parameters to a display of the work vehicle.

FIG. 8 illustrates a local control element 808. The local control element 808 comprises a receiver part 889, a transmitter part 888, a processing unit 899 and memory 898 or memories. Program code for executing the different tasks of the local control element is stored in the memory 898 or memories. Further, the memory can store data related to the implement. Sensor data obtained from the at least one sensor and possible control data from the operator input element can be stored in the memory. Further, processed information related to the obtained sensor data may also be stored on the memory. Thus, intelligence is related to implement, the local control element is not only a gatherer of data.

Accordingly, all data related to the implement is obtained, processed and stored within the implement. Thus, as all data related to the implement is stored in the memory of the implement. This has the consequence that if an implement is moved for example to another working vehicle, all data associated therewith follows the implement. Accurate monitoring of the operation of the implement is enabled. Operational data is obtained by and related to the implement. Switching the implement between working vehicles can be made without disturbing monitoring. Monitoring can be made when the implement is attached to any working vehicle. Communication with the implement can be performed digitally. No analogue signals for example related to sensor data is for example communicated to the working vehicle. For example, the local control element can form a CAN node in a CAN network of the working vehicle. When the local control element is used for control of hydraulics at the working vehicle for control of the implement, the working vehicle does not need to comprise components secured for control of the implement. All such components are present within the implement. Thus, the working vehicle can be produced at a lower cost.

As is clear from the above, the transmitter part 888 and the receiver part 889 of the local control element can be arranged for digital transmission/reception, either wired or wirelessly. For example, the local control element transmitter and received can form a CAN transmitter/receiver connected to CAN of the working vehicle. The local control element can instead, or in addition thereto, be remotely accessed. Thus, the data stored by the implement can instead or in addition thereto be communicated to a remote location. The data can be transmitted to a remote data storage system. The remote data storage and processing system may be arranged to store data related to a plurality of implements. The remote data storage system may comprise one or a plurality of databases. Further, the data can be communicated to a mobile application. The data may be communicated to the remote data storage system via the mobile application. In one example, the implement communicates with the mobile application over Bluetooth. The mobile application or the remote storage system may provide information to different applications such as a web application, for example of the implement owner or implement user or a customer support or an administration centre.

Figure 4:
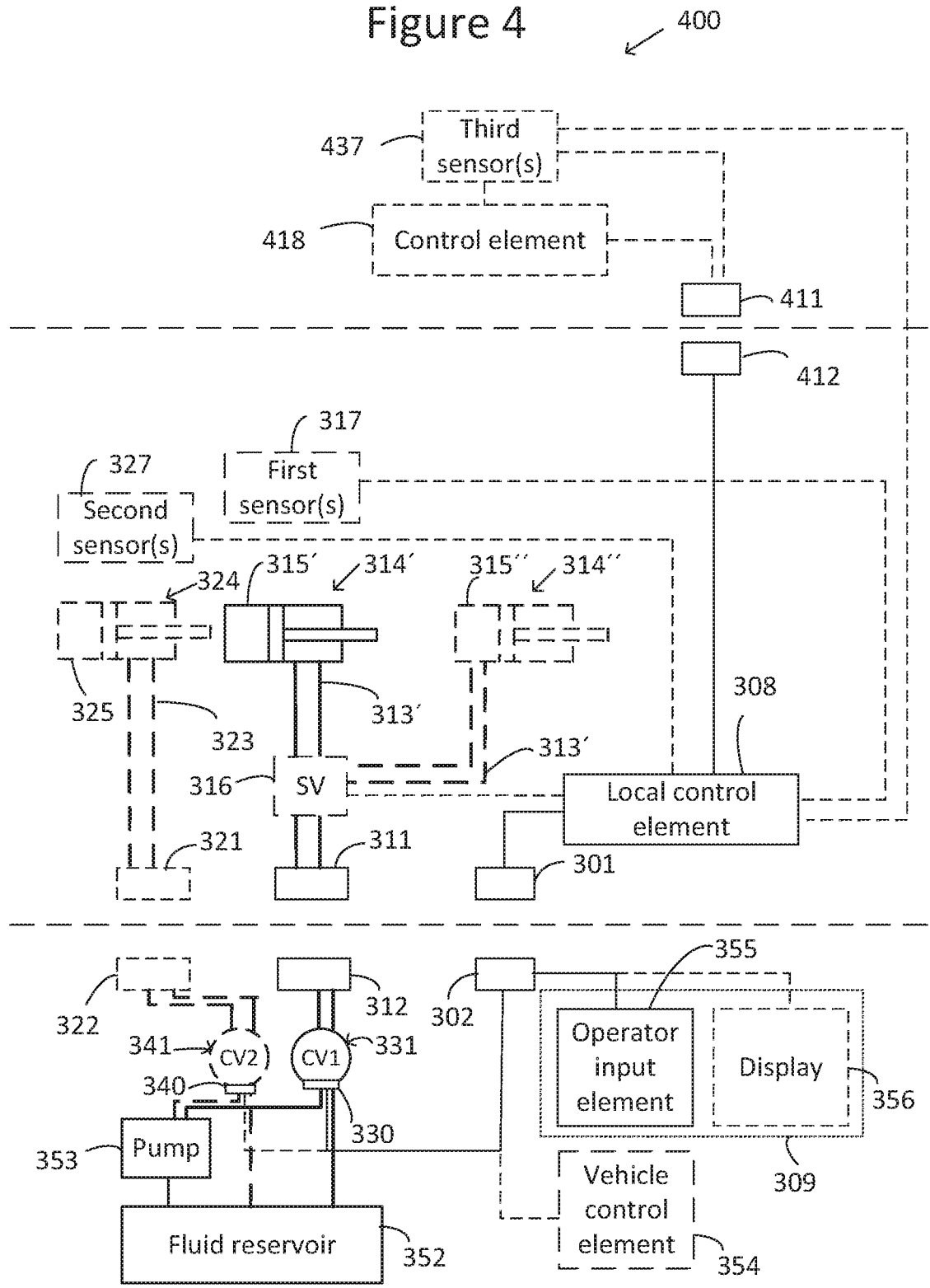
FIG. 4 illustrates a second hydraulic/electric circuit diagram for controlling an implement according to a second example.

When the working tool has a local working tool control element, for example as discussed in relation to FIG. 4, the local working tool control element can be designed in the same manner.

Figure 11:
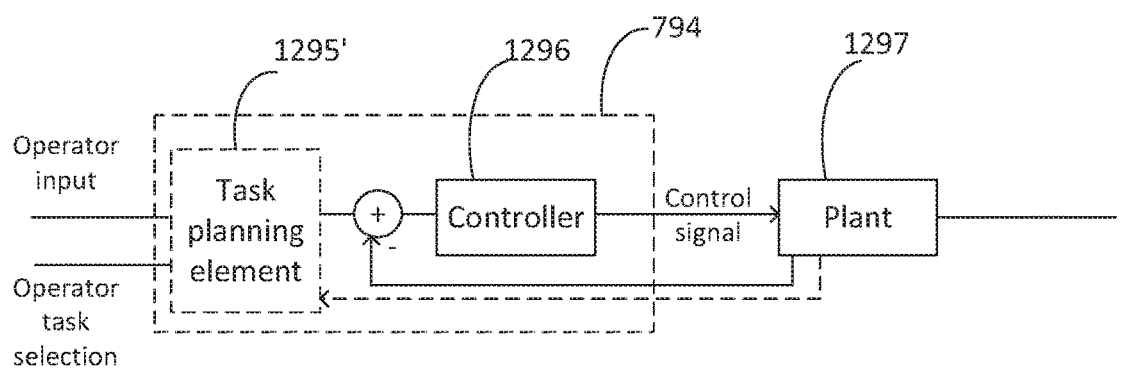
FIG. 11 is a scheme schematically illustrating the operation of a valve control element of a local control element.

In FIG. 11, an example of a valve control element of a local control element is disclosed. The valve control element receives an operator input signal received from an operator control element. The operator control signal may be a signal from a joystick or from a display with input means or from physical input buttons.

In different examples, wherein the control valve is substantially directly controlled by the joystick or input means of the display, movement of for example the joystick along one line (such as left/right) may indicate selection of a hydraulic function associated to that movement while movement of for example the joystick along a different line (such as up/down), may indicate selection of another function associated to that movement. Further when controlling the hydraulic function controlled by the selected movement, movement of the joystick in one direction (such as left) would form a selection of hydraulic flow in one direction and movement of the joystick in the other (such as right) would form a selection of hydraulic flow in the other direction. Further, the position of the joystick in relation to a zero position may form a selection of the size of the hydraulic flow.

Different tasks of the implement may be pre-programmed to a task planning element 1295'. Tasks are selected by means of an operator task selector signal. Characteristically the operator task selection signal is obtained via the input means of the display. However, different tasks can also be selected using the joystick or physical buttons in a console. The task planner is arranged to form a processed output based on the operator input signal and the operator task selection signal.

The operator input signal and/or an output from the task planning element 1295' forms as a set value to a closed loop. The closed loop comprises a controller 1296. The controller may be any type of regulator such as a P regulator, PI-regulator or a PID regulator. The signal output by the controller forms the valve control signal for the control valve(s) of the working vehicle. Further, a signal representing an actual value is fed back. Further available states of the plant 1297, i.e. control valves, implement and possibly working vehicle, are fed to the task planner for processing. The states may include obtained sensor signals. The states may include other type of information such as information related to the states of valves, the working vehicle etc.

Accordingly, the valve control element continuously obtains valve control signals for the control of the working vehicle control valves.

The task planning element 1295' may for part of the task planning element as exemplified in relation to FIG. 7.

In FIG. 9, a method for controlling at least one control valve based on operator control signals is illustrated. The method is performed at implement connectable to a working vehicle, where the implement comprises an arm, a fastening arrangement arranged at a first part of the arm, an attaching arrangement connected to a second part of the arm, said attaching arrangement being attachable to a working tool; a first hydraulic circuit configured to carry hydraulic fluid to at least one first hydraulic function; an digital interface to the working vehicle and a local control element connected to said interface. The method comprises the steps of: receiving S1 via said interface, said interface being a digital interface an operator control signal for operator control of the at least one first function; determining S2 by means of the local control element a valve control signal adapted to control at least one control valve based on said operator control signal: and transmitting S3 said valve control signal to the control valve. The control valve(s) may be arranged at the working vehicle.

The examples as disclosed herein present examples of control and possibly presentation of information based on use of exemplified sensor types. However the control signals and possible information for presentation may be based on any type of sensors. For example, sensors may be mounted to the implement and/or working tool attached thereto, including but not limited to at least one accelerometer and/or at least one GPS receiver or the like and/or at least one volt meter and/or at least one strain gauge or other force sensing sensor.

We claim:

1. An implement connectable to a working vehicle, said implement comprising an arm;
    a fastening arrangement arranged at a first part of the arm, said fastening arrangement being connectable to a working vehicle;
    an attaching arrangement connected to a second part of the arm, said attaching arrangement being attachable to a working tool;
    a first hydraulic circuit configured to carry hydraulic fluid to at least one first hydraulic function, wherein the at least one first hydraulic function comprises a function for movement of the working tool in relation to the implement; and
    a local control element, wherein the implement comprises a digital interface for communication with the working vehicle, and
    a second hydraulic circuit configured to carry hydraulic fluid to at least one second hydraulic function, wherein an operator control signal received via said digital interface is arranged for operator control of the second hydraulic function, wherein the at least one second hydraulic function comprises a function for lifting/lowering of the implement, and
    at least one first sensor arranged to obtain sensor signals at least related to the at least one first hydraulic function, at least one second sensor arranged to obtain sensor signals related to the at least one second hydraulic function,
    wherein the local control element is arranged to:
        receive the operator control signal via said digital interface for operator control of the at least one first hydraulic function and for control of the at least one second hydraulic function,
        receive the obtained sensor signals relating to the first and second hydraulic functions,
        determine a valve control signal adapted to control at least one control valve for controlling the first hydraulic circuit and for controlling the second hydraulic circuit based on said operator control signal and based on the received sensor signals relating to the first and second hydraulic functions, and
        transmit said valve control signal to the digital interface for transmission to the control valve.
2. The implement according to claim 1, wherein the valve control signal is a voltage signal, frequency or pulse width modulated signal within the range 0-5 V.
3. The implement according to claim 1, wherein the local control element is arranged to obtain an additional valve control signal adapted to control at least one additional control valve at the implement based on said operator control signal, and to feed said additional valve control signal to said at least one additional control valve.
4. The implement according to claim 3, wherein the operator control signal comprises a selector signal, and wherein the least one additional control valve comprises a switch valve arranged to switch between opening and closing based on the selector signal and a selector valve arranged to select hydraulic circuit based on the selector signal.
5. The implement according to claim 1, wherein the digital interface is arranged to transfer the valve control signal wirelessly to the working vehicle.
6. The implement according to claim 1, wherein the digital interface comprises a contactless probe for connection to a digital data bus of the working vehicle, said contactless probe being arranged to monitor a traffic on the digital data bus and to recover signals or messages having predetermined characteristics.
7. The implement according to claim 6, wherein the contactless probe is arranged to recover signals or messages comprising the operator control signal.
8. The implement according to claim 1, wherein the digital interface is arranged to transfer the valve control signal by way of a digital channel.
9. The implement according to claim 1, further comprising a digital working tool interface for communication with at least one of the working tool sensor or a local working tool control element at the working tool, wherein the digital working tool interface is connected to the local control element.
10. The implement according to claim 9, wherein the digital working tool interface is arranged to communicate wirelessly with at least one of the working tool sensor or a local working tool control element at the working tool.
11. The implement according to claim 9, wherein the digital working tool interface is arranged to communicate with the at least of the working tool sensor or a local working tool control element by way of a digital channel.
12. The implement according to claim 1, wherein the local control element is arranged to receive the obtained sensor signals, to calculate a state parameter related to the implement based on the obtained sensor signals and to feed the calculated state parameter to the digital interface.
13. A working vehicle arrangement, comprising:
    a working vehicle comprising a second fastening arrangement; and
    wherein the implement according to claim 1 is connectable to the second fastening arrangement of the working vehicle.
14. The working vehicle arrangement according to claim 13, wherein the implement is detachably fastened to the second fastening arrangement of the working vehicle.
15. The working vehicle according to claim 13, wherein the implement is detachably fastened to the working vehicle such that the implement is rotatable in relation to the working vehicle in at least one direction.
16. The working vehicle arrangement according to claim 13, wherein the working vehicle comprises at least one control valve arranged to be at least partly controlled by the valve control signal.
17. The working vehicle arrangement according to claim 13, further comprising a digital channel for transmission of the valve control signals from the digital interface to the at least one control valve.
18. The working vehicle arrangement according to claim 17, wherein the digital channel comprises a wireless channel.

19. The working vehicle arrangement according to claim 17, wherein the digital channel comprises a digital data bus.

20. The working vehicle arrangement according to claim 13, further comprising an operator interface for operator control of the first hydraulic function and the second hydraulic function, said operator interface being arranged to communicate with the digital interface.

21. The working vehicle arrangement according to claim 20, wherein the operator interface comprises an operator input element.

22. The working vehicle arrangement according to claim 20, wherein the operator interface comprises a display arranged to display information related the at least one hydraulic function.

23. The working vehicle arrangement according to claim 22, wherein the display has input means, or alternatively, is connected to the input means.

24. The working vehicle arrangement according to claim 20, further comprising a gateway arranged to direct signals from the operator interface intended for the local control element to said local control element via the digital interface and/or to direct valve control signals received directly from the local control element or via the digital interface to the control valve.

25. The working vehicle arrangement according to claim 24, wherein the gateway is implemented in a vehicle control element for control of vehicle functions.

26. A method for controlling at least one vehicle control valve based on operator control signals, the method being performed at implement connectable to a working vehicle, wherein said implement comprising a fastening arrangement arranged at a first part of the implement, an attaching arrangement connected to the second part of the implement, said attaching arrangement being attachable to a working tool; a first hydraulic circuit configured to carry hydraulic fluid to at least one first hydraulic function, wherein the at least one first hydraulic function comprises a function for movement of the working tool in relation to the implement; a second hydraulic circuit configured to carry hydraulic fluid to at least one second hydraulic function wherein the second hydraulic function comprises a function for lifting/lowering of the implement; a digital interface to the working vehicle and an local control element connected to said interface, the method comprising the steps of:
receiving, via said digital interface an operator control signal for operator control of the at least one first function and for operator control of the at least one second function;
receiving obtained sensor signals related to the at least one first function and to the at least one second function;
determining, by means of the local control element, a valve control signal adapted to control at least one control valve for control of the first hydraulic circuit and the the second hydraulic circuit based on said operator control signal and said received obtained sensor signals; and
transmitting said valve control signal to the digital interface for transmission to the at least one control valve.

* * * * *